US012812000B2

(12) United States Patent
Lal et al.

(10) Patent No.: US 12,812,000 B2
(45) Date of Patent: Nov. 24, 2026

(54) SYSTEMS AND METHODS FOR PROVISIONING QUALITY OF SERVICE FOR CONTENT ITEM DELIVERY

(71) Applicant: Adeia Guides Inc., San Jose, CA (US)

(72) Inventors: Dhananjay Lal, Englewood, CO (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 51 days.

(21) Appl. No.: 18/973,434

(22) Filed: Dec. 9, 2024

(65) Prior Publication Data

US 2026/0163933 A1 Jun. 11, 2026

(51) Int. Cl.
*H04L 65/80* (2022.01)
*H04L 65/61* (2022.01)

(52) U.S. Cl.
CPC .............. *H04L 65/80* (2013.01); *H04L 65/61* (2022.05)

(58) Field of Classification Search
CPC ................................ H04L 65/80; H04L 65/61
See application file for complete search history.

(56) References Cited

U.S. PATENT DOCUMENTS

2025/0294081 A1* 9/2025 Parla .................. H04L 63/0272
2025/0323983 A1* 10/2025 De Foy ............... H04L 65/1108
2026/0005979 A1 1/2026 Lal et al.
2026/0052107 A1* 2/2026 Rehman .............. H04L 41/5025
2026/0181519 A1 6/2026 Doken et al.

FOREIGN PATENT DOCUMENTS

EP 1782584 B1 8/2011

OTHER PUBLICATIONS

"DAA: Deciding Between Remote PHY and Remote MACPHY", Vecima Whitepaper, available online at <https://vecima.com/wp-content/uploads/2022/04/WHITEPAPER_DAA-Deciding-Between-Remote-PHY-and-Remote-MACPHY_-Final.pdf>, Dec. 16, 2024, 8 pages.
"Media Over QUIC (moq)", Charter for Working Group, available online at <https://datatracker.ietf.org/group/moq/about/>, retrieved on Dec. 16, 2024, pp. 1-4.
"PacketCable (Trademark) Multimedia Specification, Multimedia Specification", PKT-SP-MM-107-151111, available online at <https://community.cablelabs.com/wiki/plugins/servlet/cablelabs/alfresco/download?id=152f0820-cf0c-4a23-ada3-898746e490c2>, retrieved on Dec. 16, 2024, pp. 1-164.
(Continued)

*Primary Examiner* — Tonia L Dollinger
*Assistant Examiner* — Joseph M Cousins
(74) *Attorney, Agent, or Firm* — HG Law LLP

(57) ABSTRACT

Systems and methods are provided for provisioning quality of service for content item delivery. The content item is delivered by a media over QUIC transport (MoQT) relay and via an access network, and metadata associated with the delivery of the content item is received at the MoQT relay. One or more QoS configuration changes to make for delivering the content item via the MoQT session are determined at the MoQT relay and based on the received metadata, and a request to make the one or more QoS configuration changes to the MoQT session is generated. The request to make the one or more QoS configuration changes to the MoQT session is transmitted from the MoQT relay, and the content item is delivered by the MoQT relay and via a reconfigured MoQT session.

18 Claims, 13 Drawing Sheets

(56) References Cited

OTHER PUBLICATIONS

"What is 5QI in 5G", 5G World Pro, available online at <https://www.5gworldpro.com/uncategorized/what-is-5qi-in-5g.html>, Nov. 6, 2024, pp. 1-2.
"Wi-Fi Certified Wmm Programs", Wi-Fi Alliance, available online at <https://www.wi-fi.org/discover-wi-fi/wi-fi-certified-wmm-programs>, retrieved on Dec. 16, 2024, pp. 1-3.
3GPP TS 23.501 "3rd Generation Partnership Project; Technical Specification Group Services and System Aspects; System architecture for the 5G System (5GS); Stage 2 Release 19", TS 23.501, V19.1.0, Sep. 2024, pp. 1-735.
Begen, A. et al., "RFC 8866 SDP: Session Description Protocol", Internet Engineering Task Force (IETF), Jan. 2021, pp. 1-57.
Bralley, B., "What's the deal with Media Over QUIC?", IETF News, available online at https://www.ietf.org/blog/moq-overview/, Jan. 25, 2024, pp. 1-12.
Cui, Y., et al., "MoQ relay for support of deadline-aware media transport draft-ma-moq-relay-for-deadline-02", Internet-Draft, available online at <https://datatracker.ietf.org/doc/draft-ma-moq-relay-for-deadline/>, Sep. 5, 2024, pp. 1-2.
Curley, L. et al., "Media over QUIC Transport draft-ietf-moq-transport-07", Media Over Quic, Internet-Draft, available online at <https://datatracker.ietf.org/doc/draft-ietf-moq-transport/>, Oct. 21, 2024, pp. 1-37.
Curley, L., et al., "Media over QUIC - Transfork draft-lcurley-moq-transfork-02", moq Internet-Draft, available online at <https://datatracker.ietf.org/doc/draft-lcurley-moq-transfork/>, Oct. 15, 2024, pp. 1-21.
Doken, S. et al., U.S. Appl. No. 18/989,258, filed Dec. 20, 2024. Title: Systems and Methods for Intelligent Spectrum-Aware Routing of Last-Mile Video Traffic.
Gaitonde, A., "How QUIC is Displacing TCP for Speed and Security ?", Engineering at Scale, available online at <https://engineeringatscale.substack.com/p/how-quic-is-displacing-tcp-for-speed>, Oct. 11, 2023, pp. 1-13.
Gurel, Z. et al., "Need for Low Latency: Media over Quic.", MHV '23: Proceedings of the 2nd Mile-High Video Conference, Jun. 16, 2023, pp. 139-140.
Jennings, C. et al., "End-to-End Secure Objects for Media over QUIC Transport draft-jennings-moq-secure-objects-01", Oct. 20, 2024, Network Working Group Internet-Draft, available online at <https://datatracker.ietf.org/doc/draft-jennings-moq-secure-objects/>, Oct. 20, 2024, pp. 1-10.
Johnston, A. et al., "Session Description Protocol (SDP) Offer/Answer Examples", Network Working Group, Request for Comments: 4317, Dec. 2005, pp. 1-24.
Lal D. et al., U.S. Appl. No. 18/756,163, filed Jun. 27, 2024. Title: Network Assisted Delivery of HTTP Transport.
Li, J. et al., "LiveNet: a low-latency video transport network for large-scale live streaming", SIGCOMM '22: Proceedings of the ACM SIGCOMM 2022 Conference, Aug. 22, 2022, pp. 812-825.
Riddel, J. et al., "Chapter 14: Multimedia Applications", Network World, available online at <https://www.networkworld.com/article/2297189/chapter-14--multimedia-applications.html>, Dec. 16, 2024, pp. 1-26.
Robin Marx, "HTTP/3: Performance Improvements (Part 2)", Smashing Magazine, available online at <https://www.smashingmagazine.com/2021/08/http3-performance-improvements-part2/#connectionmigration>, Aug. 23, 2021, pp. 1-41.
Shi, H. et al., "Design Space Analysis of MoQ draft-shi-moq-design-space-analysis-of-moq-03", Internet-Draft, available online at <https://datatracker.ietf.org/doc/draft-shi-moq-design-space-analysis-of-moq/>, Sep. 4, 2024, pp. 1-2.
Dan Wang et al., "Update on Sol #10 PDU Set information identification based on MoQ", 3GPP Draft, S2-2405092, vol. SA WG2, Apr. 15-19, 2024, 5 Pages.
Frindell, A. et al., "Media Over QUIC (moq)." Internet Engineering Task Force (IETF). Charter., Retrieved on May 30, 2024, Retrieved from https://datatracker.ietf.org/wg/moq/about/, 4 pages.

* cited by examiner

SYSTEMS AND METHODS FOR PROVISIONING QUALITY OF SERVICE FOR CONTENT ITEM DELIVERY

The present disclosure is generally directed to systems and methods for provisioning quality of service (QoS) for content item delivery.

SUMMARY

With the widespread availability of relatively fast and stable Internet connections, many people stream media, such as television programs, via the Internet; however, delivering media to a computing device, such as a smart television, via the Internet is a relatively resource-intensive process. Streaming media via the Internet typically utilizes the transmission control protocol (TCP); however, TCP was developed and implemented before the widespread adoption of media streaming, and, as such, there are limitations around latency and bandwidth. One approach to address these limitations has been the widespread adoption of adaptive bitrate streaming (ABR), particularly by over-the-top (OTT) platforms; however, ABR still typically utilizes TCP. Another approach has been to replace the TCP protocol altogether when streaming media over the Internet. One such replacement protocol is the quick user datagram protocol (UDP) Internet connection (QUIC) protocol developed by the Internet Engineering Task Force. In particular, HTTP/3 is built using QUIC as its transport mechanism. One approach to deliver media over QUIC is the media over QUIC transport (MOQT) protocol, which enables a producer of media to publish media and have it consumed by a plurality of endpoints. MOQT enables relays to form one or more overlay delivery networks that are independent of the publisher to enable the media content to be delivered via the Internet. These overlay delivery networks may be similar in functionality to content delivery networks (CDNs).

Internet service providers, or communication service providers, have different underlying systems for providing access to the Internet, or similar networks. Access may be provided, for example, via cable broadband and/or via mobile broadband. A difference between these network categories is in the access network. In a cable network, the access network typically lies between a cable modem termination system (CMTS) and a cable modem. A cable network typically uses optical and/or radio frequency technologies over coax, collectively referred to as hybrid fiber coax (HFC). When clients connect to the cable modem, for example, via router and over Wi-Fi, then that the router and Wi-Fi connection is another part of the access network. In a mobile network, the access network, called a radio access network (RAN) is typically located between a user equipment computing device, such as a smartphone, and a base station (for example, evolved NodeB (eNB) and/or a gNodeB (gNB)). The RAN may also be called a mobile fronthaul.

In order to enable the prioritization of limited network bandwidth for different purposes on a network, QoS mechanisms and technologies enable network traffic to be, for example, controlled, prioritized and processed. QoS may be applied to, for example, different types of network traffic including, for example, internet protocol television, online gaming, streaming media, videoconferencing, video on demand, and/or voice over internet protocol. The access network of a system may typically be a bottleneck for throughput and real-time performance, which typically makes QoS more relevant to this part of a system.

Mobile access networks and cable access networks may have their own specification on QoS and QoS enablement. For example, dynamically configuring a new connection over a cable access network with specified QoS can be addressed in the PacketCable multimedia (PCMM) specification. Inside a home network, QoS on Wi-Fi can be addressed by separate mechanisms such as the Wi-Fi multimedia specification and the enhanced distributed channel access function in the IEEE 802.11e specification. QoS for mobile network devices is also addressed by the 3GPP alliance in their technical specification 23.501, system architecture for the 5G System.

Video traffic, such as streaming video content from an OTT provider, constitutes a large proportion of global internet traffic. Amongst that video traffic, real-time video traffic such as livestreaming events and/or sports; video conferencing; and/or gaming and/or cloud gaming, typically demand higher QoS than other video connections. Such higher QoS demands may be expressed in terms of higher bandwidth, latency and/or priority requirements, depending on the specific application streaming the video content. As access networks are typically a bottleneck in a system, such as an internet service provider (ISP) network, there is a need to provision QoS for real-time video delivery over the access network.

To help address these problems, systems and methods are provided for provisioning QoS for content item delivery.

In accordance with some aspects of the disclosure, a method for QoS provisioning for content item delivery is provided that includes delivering the content item via a MoQT session by at least one MoQT relay and via an access network, and receiving metadata associated with the delivery of the content item at a MoQT relay of the at least one MoQT relays. One or more QoS configuration changes, or adjustments, to make for delivering the content item via the MoQT session are determined at the MoQT relay and based on the received metadata, and a request to make the one or more QoS configuration changes, for example, in the access network, to the MoQT session is generated. The request to make the one or more QoS configuration changes to the MoQT session is transmitted from the MoQT relay, and the content item is delivered by the MoQT relay and via a reconfigured MoQT session.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

DETAILED DESCRIPTION

Figure 1:
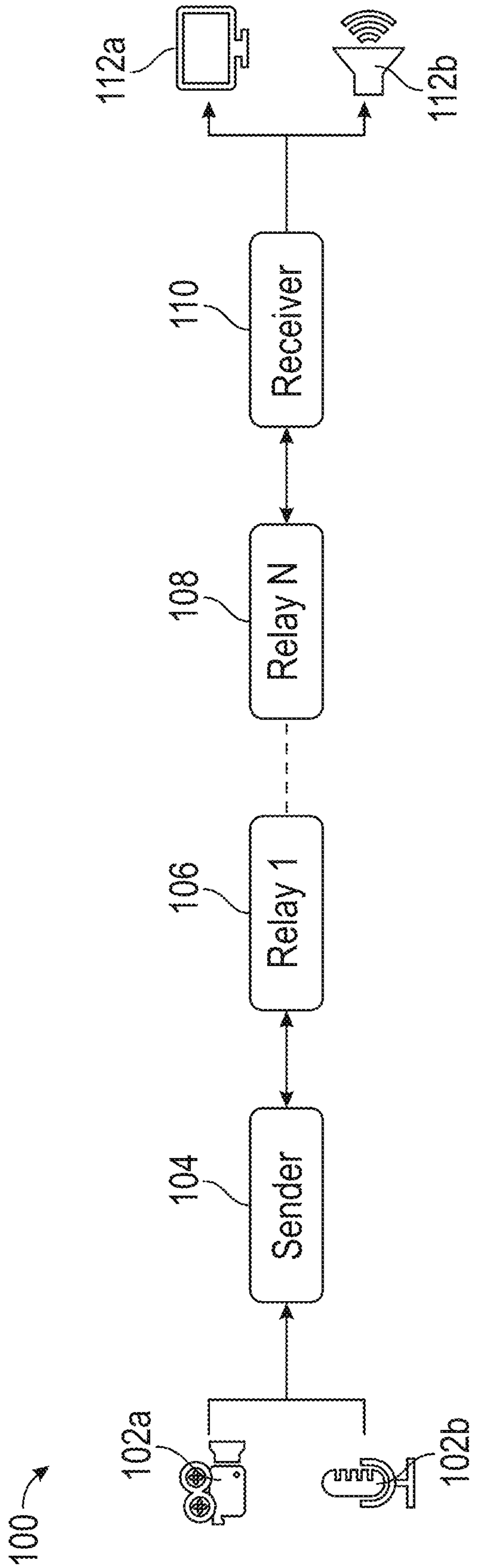
FIG. 1 shows a schematic diagram of a system for delivering a content item via MoQT.

A content item includes audio, video, text, a video game and/or any other media content. A live content item may be a content item that is broadcast at the same time, or at substantially the same time, as an event that is being captured for broadcast. In another example, a live content item may be a content item that is broadcast at a scheduled time, such as an episode of a show. A content item may be a single media item. In other examples, it may be a series (or season) of episodes of content items. Video includes audio-visual content such as movies and/or television programs or portions thereof. Audio includes audio-only content, such as podcasts or portions thereof. Text includes text-only content, such as event descriptions or portions thereof.

In some examples, a node that a broadcaster connects to may be called a producer node, and a node that a viewer connects to may be called a consumer node. A broadcaster may upload a media content item, including live content, to the producer node, where the producer node may process the media content item (e.g., transcode, package and/or insert advertising) if needed. A consumer node may receive requests from consumer, or viewer, computing devices. If a consumer node is already serving a content item stream, and has recent video frames cached, it may immediately respond with the content item. Otherwise, the consumer node may initiate a path lookup request to a central control plane or upstream relay mode with, for example, a stream ID or a track identifier (such as TrackNamespace and/or TrackName) as the input. The overlay path returned may dictate how the content item can be transmitted from the producer node to the consumer nodes, potentially via intermediate nodes (relays). In some examples, a consumer node may only be aware of its upstream relay via a subscriber-publisher relationship. In any case, the consumer node is aware of where to direct its request. These relays may cache video content and may be used to construct arbitrary path topologies.

An overlay network is any suitable virtual or logical network for delivering a content item over a physical network, such as the Internet. Typically, an overlay network comprises at least one sending computing device, at least one relay computing device and at least one receiving computing device. The sending computing device may receive a portion of a content item and transmits it to a relay computing device. The relay computing device may transmit the portion of the content item to another relay computing device and/or to a receiving computing device, such as a smart television, tablet, smartphone, laptop, PC and/or smart speaker. The sending and/or relay computing devices may comprise one or more physical and/or virtual servers. In some examples, the relay computing devices may be part of one or more third-party networks, independent of both a publisher of a media content item, and a subscriber to the media content item. The relay computing device may cache content for distribution efficiency while simultaneously routing content and deterministically responding to congestion in a multi-tenant network. In MOQT, a relay may be the equivalent of a CDN point of presence that is involved in the delivery of content items, such as live and/or real-time media.

A routing path includes a path that data packets take from a source to a destination across a network. The path may be a physical and/or virtual path. The data packets may be content item data packets. A source may be a server on which a content item is stored. A destination may comprise a plurality of destinations including, for example, one or more of a smart television, tablet, smartphone, laptop, PC and/or smart speaker. A routing path may comprise one or more relay computing devices, and the path may be reconfigured (or a new path formed) by adding and/or removing one or more relay computing devices to/from the path. In some examples, the path may be reconfigured in response to, or based on, an overlay network reconfiguration event.

A network reconfiguration event includes any event that may be utilized to trigger a change in a routing path. In some examples, a heartbeat signal may be received from, for example, a relay computing device, and a change in the heartbeat signal may be identified as a network reconfiguration event. In another example, a network reconfiguration event may comprise identifying that a relay device has suffered a loss of bandwidth. Such identification may, for example, be made by a central control plane server or self-reported by the relay. In a further example, a number of consumers of a content item over a routing path may increase to the extent that a further relay device needs to be added to the routing path in order to satisfactorily manage the traffic associated with delivering the content item to the consumers.

A further relay device or node, such as a second relay device or a new relay device, may be added to a routing path based on a network reconfiguration event. This further relay device may be provisioned before it is configured to be addable to an overlay network. In other examples, the further relay device may be provisioned in response to a network reconfiguration event, and added to the overlay network after it has been provisioned, or during the provisioning. In some examples, the provisioning may comprise provisioning the relay device based on a cause of the network reconfiguration event, for example, to optimize the relay device to be less likely to suffer from an issue that triggered the network reconfiguration event.

A heartbeat signal is any signal that is received from another computing device including one or more relay and/or client computing devices. The heartbeat signal may be a signal that is transmitted at a fixed interval, or period. In other examples, the heartbeat signal may be transmitted regularly, such as in response to a change in conditions. A heartbeat signal may also indicate that conditions have not changed, and the lack of signal may indicate a network reconfiguration event. The heartbeat signal may comprise a suitable metric including, for example, a rebuffering ratio, a content item start up time, a number of content item start failures, an average bitrate of a content item, an average frame rate of a content item and/or a rendering quality of a content item.

Messages such as termination messages and subscribe messages may be used to control one or more aspects of an overlay network. An example of a termination message is a media over QUIC (MOQ) GOAWAY message and an example of a subscribe message is a MOQ SUBSCRIBE message. A GOAWAY message includes instructions to initiate a graceful shutdown of a connection so that a computing device may stop accepting new requests while still finishing the processing of previously received requests. A SUBSCRIBE message includes instructions to send data, such as content item data, to a device or relay that wants to receive a content item.

MOQT typically requires a long-lived and stateful session; however, a service provider may require the ability to shut down and/or restart a server without waiting for all sessions to drain naturally, when in some cases may take days for long-form media. MOQT avoids this via the GOAWAY message. A server may send a GOAWAY message, signaling that a client should establish a new session and migrate any active subscriptions. The GOAWAY message may contain a new uniform resource indicator (URI) for the new session; otherwise the current URI may be reused. In some examples, a GOAWAY message may be used by relays to selectively redistribute some downstream nodes, for example, consumers to other relays.

The quality of a content item may comprise one or more of a resolution and/or bitrate of the content item. For example, a high-quality content item may have a relatively high resolution, bitrate, dynamic range, number of audio channels and/or framerate, and a low-quality content item may have a relatively low resolution, bitrate, dynamic range, number of audio channels and/or framerate. In some examples, a high-quality content item may be a 2K resolution content item with a high dynamic range and 7.1 sound, and a low-quality content item may be a 720p resolution content item, with a low dynamic range and 2.1 sound.

The disclosed methods and systems may be implemented on one or more devices, such as user devices and/or computing devices. As referred to herein, the device can be any device comprising a processor and memory, for example, a handheld computer, a mobile telephone, a portable video player, a portable music player, a portable gaming machine or console, a smartphone, a smartwatch, a smart speaker, an augmented reality headset, a mixed reality device, a virtual reality device, a gaming console, a vehicle infotainment headend or any other computing equipment, wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media cards, register memory, processor caches, random access memory (RAM) and/or a solid-state drive.

MOQT utilizes a publish/subscribe workflow in which producers of media publish data, for example via servers, in response to subscription requests from a multiplicity of consumer computing devices. A wide range of media may be delivered via MOQ including, for example, live streaming, gaming, and media conferencing. MOQT-specific mechanisms may be leveraged in order to reconfigure a media delivery overlay network.

FIG. 1 shows a schematic diagram of a system for delivering a content item via MoQT. In some examples, a media delivery overlay network topology may change as producers, consumers and relays change. The environment 100 comprises first and second tracks 102*a*, 102*b* of a content item; an overlay network comprising a sender computing device 104, a first relay computing device 106, a second relay computing device 108 and a receiver computing device 110; and a consumer computing device comprising a display 112*a* and a speaker 112*b*. In this example, the first track 102*a* is a video track and the second track 102*b* is an audio track. One or more of the sender computing devices 104, the first relay 106, the second relay 108 and the receiver computing device 110 may comprise one or more virtual and/or physical servers. The consumer computing device may comprise any computing device including, for example, a smart television, tablet, smartphone, laptop, PC, smart speaker. One or more tracks 102*a*, 102*b* are transmitted over the overlay network to the consumer computing device. In this example, the video track 102*a* and the audio track 102*b* are transmitted to the sender computing device 104, where they are then transmitted to the first relay computing device 106. In this example, the portions are transmitted over the overlay network via MoQ. The tracks 102*a*, 102*b* are transmitted from the first relay computing device 106 to a second relay computing device 108. In this example, there may be one or more relay devices (not shown) in between the first relay computing device 106 and the second relay computing device 108. On receiving the tracks 102*a*, 102*b*, the second relay device 108 transmits the portions to the receiver computing device 110, which transmits the portions to the consumer computing, where the video track 102*a* is output at the display 112*a*, and the audio track 102*b* is output at the speaker 112*b*.

A basic data element of MOQT is an object. An object is an addressable unit whose payload is a sequence of bytes. All objects belong to a group, indicating ordering and potential dependencies. An object is uniquely identified by its track namespace, track name, group ID, and object ID, and must be an identical sequence of bytes regardless of how or where it is retrieved. Objects are comprised of two parts: metadata and a payload. Typically, the metadata is not encrypted and is always visible to relays. The payload portion may be encrypted, in which case it is visible only to the producer and consumer.

MOQT defines a publish-based and/or subscribe-based media delivery protocol, wherein endpoints, called producers, publish objects that are delivered via participating relays to receiving endpoints, called consumers. A track contains a sequence of groups and serves as the entity against which a consumer issues a subscription request. Objects are comprised of two parts: envelope and a payload. The envelope is not end-to-end encrypted, and is visible to relays. The payload portion may be end-to-end encrypted, in which case it is visible only to the producer and consumer. The application is solely responsible for the content of the object payload. Tracks are identified by a combination of its TrackNamespace and TrackName. TrackNamespace and TrackName are treated as a sequence of binary bytes. Group and Objects are represented as variable length integers called GroupId and ObjectId respectively.

Video traffic delivered over the MoQT protocol may be dynamically provisioned to have a separate QoS than the aggregate of all other traffic delivered to a premise, such as a home, or a user equipment device, such as a smartphone. Unencrypted metadata pertaining to a QUIC connection for a video livestream, video conferencing, or cloud gaming connection may be read and interpreted, for example by an ISP, and used to proactively configure a new portion of a communication resource available on the access network. The specific real-time video traffic leveraging MoQT may be subsequently mapped to a dynamically configured communication resource using, for example, its 5-tuple flow identifier. Unlike the typical dynamic service setup of PCMM shown in FIG. 1, as described herein, a client may not initiate the provisioning of the communication resource, rather it may be initiated by a MoQT relay and/or consumer node in the access network. In the scheme described herein, the configured communication resource may be additive to an already configured communication resource to the customer equipment (for example, at a cable modem and/or a user equipment device, such as a smartphone). This may have a technical advantage if the utilization of an available current communication resource available is already at or near capacity. In another example, it may also be technically beneficial if an ISP has, for example, an agreement with a video service provider such as Amazon and/or Hulu, such that current resource consumption due to an OTT video livestream is not counted against the provisioned communication resource (for example, network bandwidth). In another example, a user subscribes to a fiber optic service (FIOS) TV service, and the subscriber video traffic tonnage does not count against the subscriber's FIOS Internet caps; however, if the subscriber is only a FIOS Internet subscriber (i.e., not subscribed to a FIOS TV service), then the subscriber's OTT video streaming service traffic tonnage may be subject to a cap. This may, for example, provide an incentive to a customer to use a partner OTT video service for live streaming.

Figure 2:
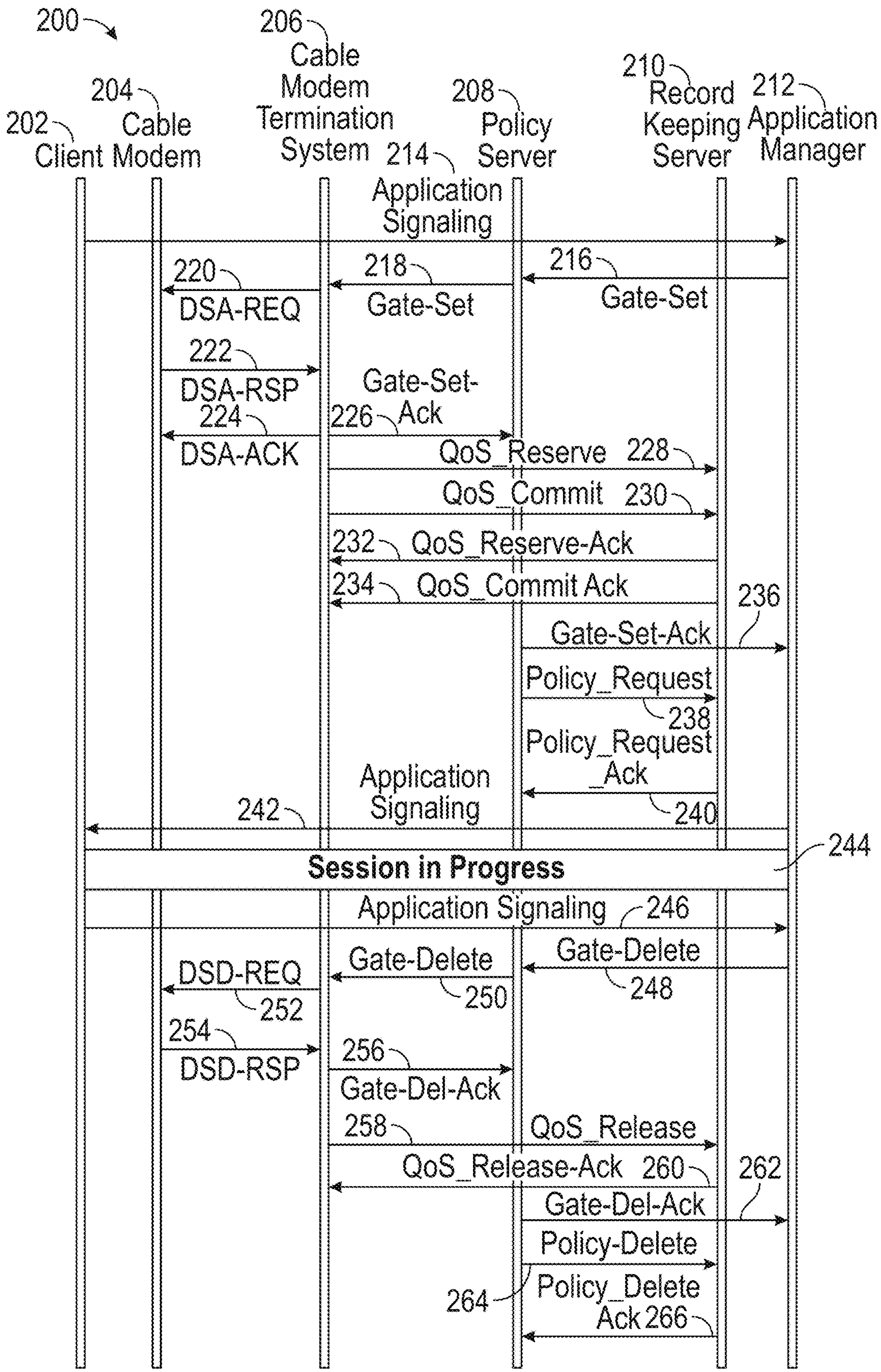
FIG. 2 shows a schematic diagram of a system for provisioning QoS for content item delivery in accordance with some embodiments of the disclosure.

FIG. 2 shows a schematic diagram of a system for provisioning QoS for content item delivery in accordance with some embodiments of the disclosure, in particular a dynamic service setup using PacketCable multimedia (PCMM). The environment 200 comprises a client computing device 202, a cable modem 204, a CMTS 206, a policy server 208, a record keeping server 210 and an application manager 212.

FIG. 2 describes how QoS is set up dynamically in a cable access network. Unlike mobile networks in which connection setups and teardowns are frequent, typical allocation of upstream and downstream bandwidths for a subscriber is based on a configuration file when a cable modem, such as the cable modem 204, boots up. The process of setting up a dynamic service with QoS (that is temporary when compared to the upstream/downstream configuration of a cable modem) is achieved through PCMM.

In this example, the client computing device 202 initializes a session by transmitting 214 an application signaling query to the application manager 212 for necessary resources to set up a dynamic service with QoS for a multimedia session. A protocol such as session initiation protocol, or hypertext transfer protocol, may be used by the client computing device 202 to request a QoS multimedia session. After receiving the application signaling from the client computing device 202, the application manager 212 interprets the required QoS parameters for the QoS session, and signals the policy server 208 for their creation. This signaling is performed by transmitting 216 a Gate-Set message to the policy server 208, which requests the needed resources for the session. The Gate-Set message may identify a subscriber and contain classifier, gate specification, and traffic profile parameters needed to achieve a desired QoS. After the policy server 208 receives the Gate-Set message from the application manager 212, the policy server 208 checks to see if the request is authorized by applying one or more predefined policies. The one or more policies may comprise, for example, limits on the number of gates allocated to a subscriber, limits on the types of QoS available to a subscriber, limits on which applications a policy server accepts and limits on the impact of service on a particular CMTS. If the request is authorized, the policy server 208 determines where that subscriber is located, and transmits 218 a Gate-Set message to the CMTS 206 where the subscriber's cable modem is connected.

The CMTS 206 checks to see whether the policy server 208 is authorized and, if the policy server 208 is authorized, the CMTS 206 checks whether the requested resources can be granted. If all of checks pass, the CMTS 206 then creates a gate, assigns a gate identifier, and converts the parameters to data over cable service interface specifications (DOCSIS) parameters. If a reserved resource envelope is included, the CMTS 206 signals the service flow creation to the cable modem 204 for admission of these resources. If a committed resource envelope is included, the CMTS signals the service flow creation and/or modification to the cable modem 204 concerning the activation of these resources. The creation and modification of DOCSIS resources are done using the DOCSIS dynamic service flow messages. If the CMTS 206 admission control succeeds, a three-way handshake of a dynamic service add (DSA)-request, DSA-response, and DSA-acknowledge is used to create a DOCSIS service flow, and the three-way handshake of a dynamic service change (DSC)-request, DSC-response, and DSC-acknowledge is used to modify a DOCSIS service flow. In this case, the gates and service flows are created, reserved, and committed all in the same step. If the service flow and gate creation process are successful, the CMTS 206 notifies the policy server 208 of this in a Gate-Set acknowledgement message. If this process is unsuccessful, a Gate-Set Error message indicating the reason for failure is returned instead. The policy server 208 then relays this message to the application manager 212. At this point, the multimedia session QoS resources are active, so the application manager 212 relays this information back to the client computing device 202.

In more detail, the CMTS 206 will initiate reserving and committing the access network resources by transmitting 220 a DSA-request to the Cable Modem 204. The cable modem 204 responds to the CMTS 206 with by transmitting 222 a DSA-response to the CMTS 206, and the CMTS 206 completes the transaction by transmitting 224 a DSA-acknowledge to the cable modem 204.

Once a DSA-response is received by the CMTS 206 from the cable modem 204 confirming a successful transaction, the CMTS 206 transmits 226 a Gate-Set message-acknowledge to the policy server 208. The CMTS 206 also transmits 228 a QoS Reserve event message to the record keeping server 210 to signal to the record keeping server 210 that the access network resources have been reserved. After transmitting 228 the QoS_Reserve event message to the record keeping server 210, the CMTS 206 transmits 230 a QoS_Commit event message to the record keeping server 210. In some examples, the access network resources may be reserved and committed in one step, in which case the CMTS may transmit 230 the QoS_Commit event message to the record keeping server 210 immediately after sending the QoS_Reserve event Message to the record keeping server 210. After receiving and recording the QoS_Reserve event message, the record keeping server 210 acknowledges the message by transmitting a QoS_Reserve acknowledge message to the CMTS 206, and after receiving and recording the QoS_Commit event message, the record keeping server 210 acknowledges the message by transmitting a QoS_Commit acknowledge message to the CMTS 206.

As a result of receiving a Gate-Set message acknowledge from the CMTS 206, the policy server 208 transmits 236 a Gate-Set message acknowledge to the application manager 212 to complete the transaction. The policy server also transmits 238 a Policy_Request event message to the record keeping server 210 to track the policy request and any outcome associated with the policy request. After receiving and recording the Policy_Request event message, the record keeping server 210 transmits a Policy_Request acknowledge to the policy server 208 to acknowledge the Policy_Request event message. The application manager 212 transmits 242, via application signaling, to the client computing device 202 that the multimedia session QoS resources are active. At 244, the multimedia session is in progress.

Once the multimedia session finishes, the client computing device 202 transmits 246, via application signaling, that the multimedia session has finished. The application manager terminates the session by transmitting 248 a Gate-Delete to the policy server 208. The policy server instructs the CMTS 206 to tear down the session by transmitting 250 a Gate-Delete to the CMTS 206. The CMTS 206 tears down the access network resources by transmitting 252 a dynamic service delete (DSD)-request to the cable modem 204, and the cable modem 204 acknowledges the session deletion by transmitting 254 a DSD-respond to the CMTS 206. The CMTS 206 completes the Gate-Control transaction by transmitting 256 a Gate-Delete-acknowledge to the policy server 208. Also, upon the receipt of the DSD-response, the CMTS 206 informs the record keeping server 210 that the network access resources have been freed by transmitting 258 a QoS_Release event message to the record keeping server 210. After receiving and recording the QoS_Release event message, the record keeping server 210 acknowledges the message by transmitting 260 a QoS_Release acknowledge to the CMTS 206.

After receiving the Gate-Delete-acknowledge from the CMTS 206, the policy server 208 transmits 262 a Gate-Delete-acknowledge to the application manager 212 to complete the Gate-Control transaction. The policy server 208 transmits 264 a Policy_Delete event message to the record keeping server 210 to complete the entire process and, after receiving and recording the Policy_Delete event message, the record keeping server 210 acknowledges the message by transmitting 266 a Policy_Delete acknowledge to the policy server 208.

Figure 3:
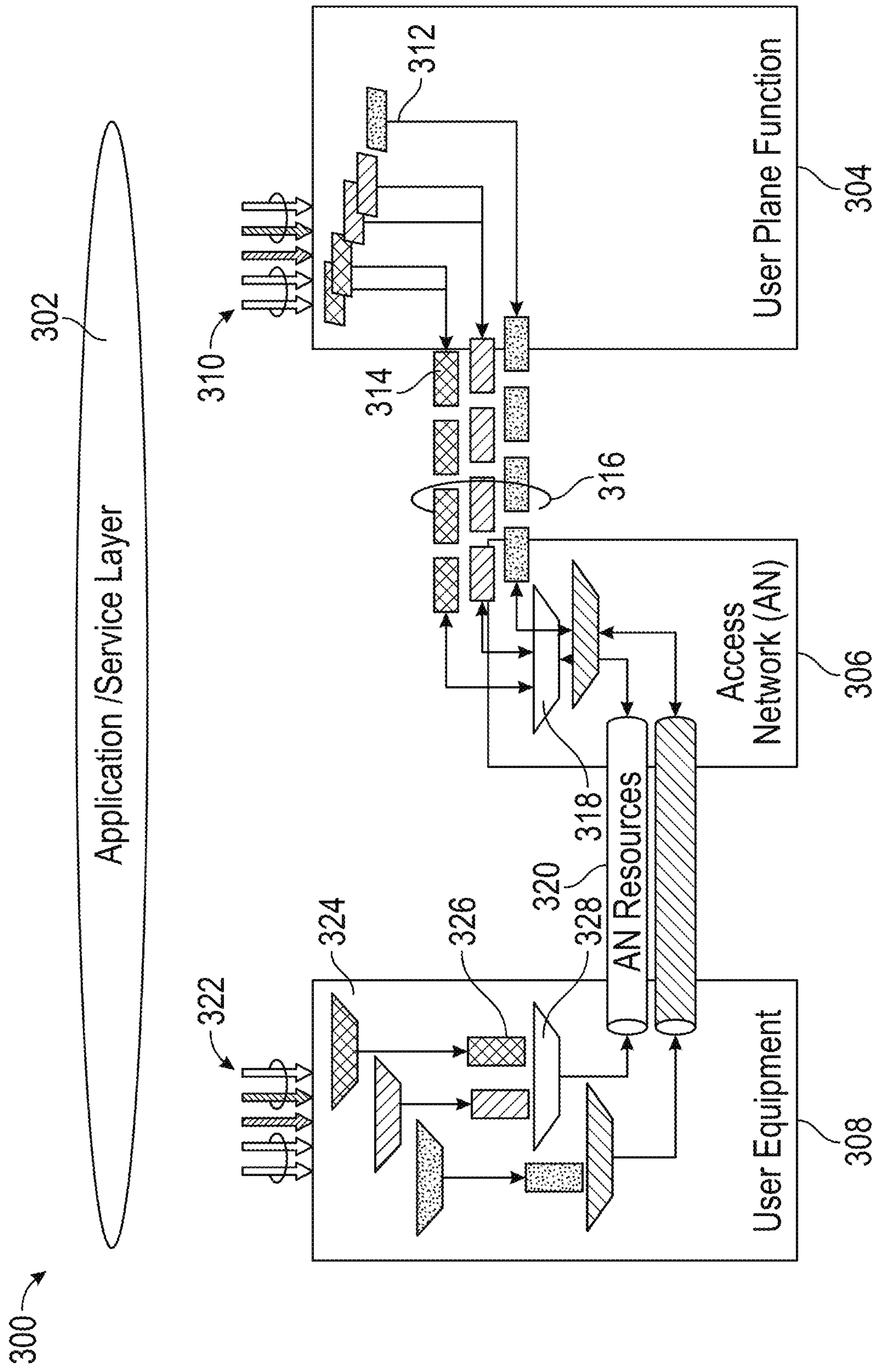
FIG. 3 shows another schematic diagram of a system for provisioning QoS for content item delivery in accordance with some embodiments of the disclosure.

FIG. 3 shows another schematic diagram of a system for provisioning QoS for content item delivery in accordance with some embodiments of the disclosure, in particular a high-level overview of how QoS flows are mapped to the access network in a 5G mobile network. The environment 300 comprises an application/service layer 302, a user plane function 304, an access network 306 and user equipment 308.

On a downlink, a first flow comprising incoming data packets 310 are classified by the user plane function 304 based on packet filter sets of the down link packet detection rules 312 in the order of their precedence. The packet detection rules 312 are applied based on a policy received from a session management function on the downlink, mapping the first flow to a 5G QoS identifier. The packet detection rules 312 are obtained from a policy charging function (i.e., a policy engine), and the packet detection rules 312 classify packets for QoS flow marking and other actions. The user plane function 304 conveys the classification of the user plane traffic belonging to a QoS flow 314 through a user plane marking using a QoS flow identifier. A protocol data unit session 316 is made up of a plurality of QoS flows. The access network 306 binds 318 QoS flows to access network resources 320. There is no strict 1:1 relation between QoS flows and access network 306 resources. It is up to the access network 306 to establish the necessary access network 306 resources that QoS flows can be mapped to, and to release them.

On a uplink, a second flow comprising uplink data packets 322 are evaluated by the user equipment 308 against uplink packet filters in a packet filter set in the QoS rules 324 based on the precedence value of QoS rules in increasing order until a matching QoS rule (i.e. whose packet filter matches the uplink packet) is found. The user equipment 308 uses the QoS flow identifier in the corresponding matching QoS rule to bind the uplink packet to a QoS flow 326. The user equipment then binds 328 QoS flows to the access network resources 320.

A flow is defined by a 5-tuple {IP Address (Source, Destination), Protocol, Port (Source, Destination)}. The flow is detected by a network, such as a cable or mobile access network, and a QoS may be applied to the flow based on a policy. The QoS identifiers and mappings for cable/DOCSIS and 5G radio networks are described in the PacketCable Multimedia specification and the 3GPP TS 23.501 system architecture respectively. In 5G, the 5G QoS identifier is mapped to QoS parameters for different flow types, such as a guaranteed bit rate, non-guaranteed bit rate and delay critical guaranteed bit rate. In the cable PCMM specification, the QoS is described using a bitmask, called the QoS Status BitMask, with an accompanying QoS Parameter Array that specifies values for each enabled field in the bitmask.

Figure 4:
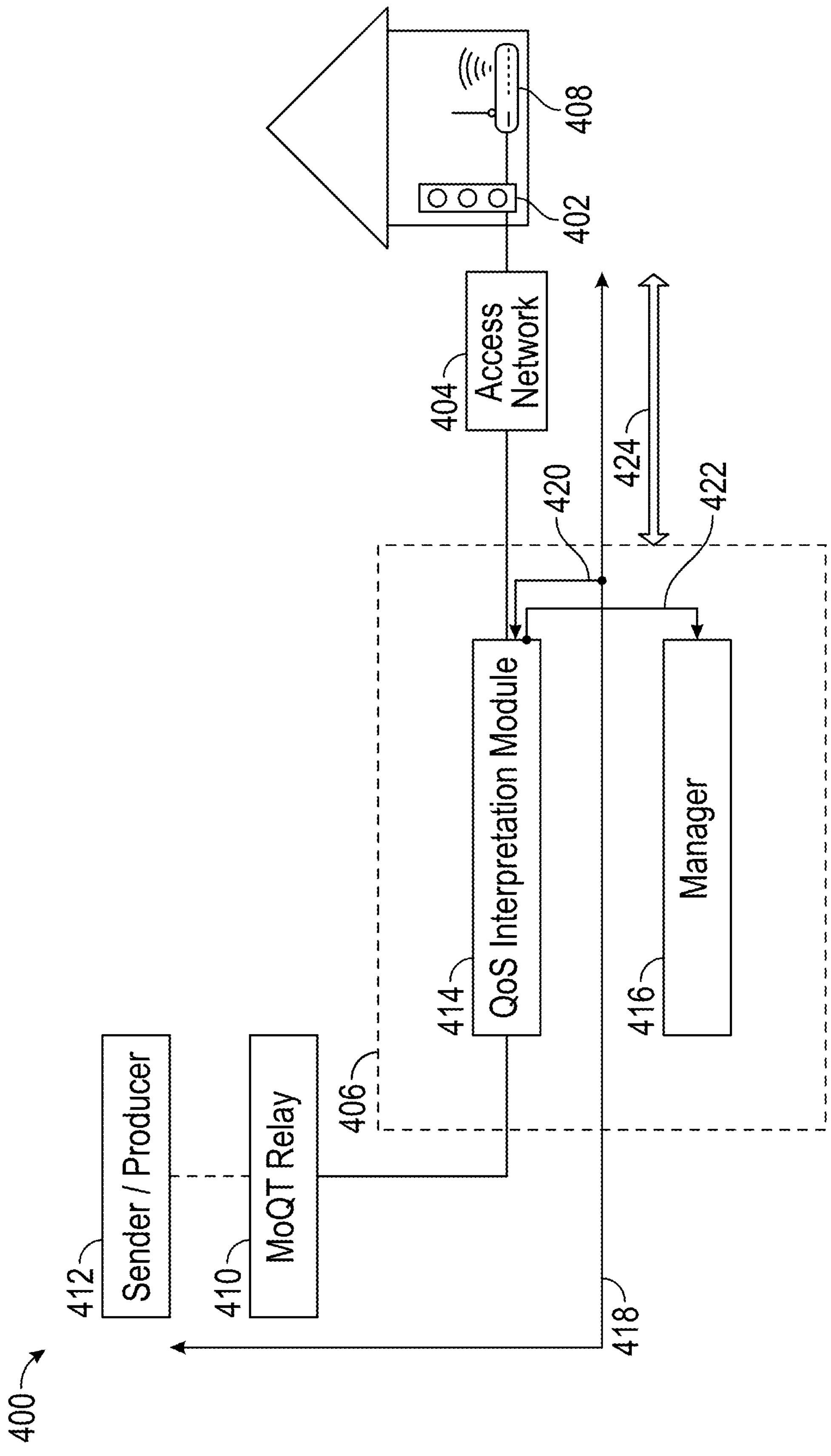
FIG. 4 shows another schematic diagram of a system for provisioning QoS for content item delivery in accordance with some embodiments of the disclosure.

FIG. 4 shows another schematic diagram of a system for provisioning QoS for content item delivery in accordance with some embodiments of the disclosure, in particular FIG. 4 shows a dynamic service configuration for MoQT data traffic. The environment 400 comprises a cable modem 402, an access network 404, a CMTS 406, a Wi-Fi router 408, a MoQT relay 410 and a sender/producer 412. The access network 404 may be a hybrid fiber-coax (HFC) access network. The CMTS 406 comprises a QoS interpretation module (QIM) 414 and a manager 416. The CMTS 406 may be a physical CMTS network function or a virtualized CMTS (such as a remote-physical radio frequency layer (R-PHY) or a remote-media access control PHY (R-MAC-PHY)) with associated computing in an upstream data center. In some examples, the CMTS 406 may comprise physical and virtual components. In a first example, the manager 416 is a PCMM application manager. In a second example, the manager 416 is a service flow manager (classic/low latency).

The access network 404 runs between the home network cable modem 402 and the CMTS 406. In this example, the CMTS 406 also acts as a MoQT relay or consumer node.

The Wi-Fi router 408 may also act as a MoQT consumer node on behalf of a media consumption device. Where the Wi-Fi router 408 acts as a MoQT consumer node, the CMTS 406 may act as a MoQT relay serving one (or more, not shown) Wi-Fi router 408 MoQT consumer nodes. In examples where there are a plurality of Wi-Fi router 408 MoQT consumer nodes, these may be present in different physical buildings, such as homes. In other examples, the CMTS 406 may act as a MoQT consumer node, aggregating livestreaming requests from, for example, multiple downstream viewers in a plurality of homes for upstream subscription to a MoQT relay.

The bidirectional arrow 418 represents an end-to-end negotiation of media session parameters between a producer and consumer, or a source/sender and a viewer of, for example, a real-time content item. Such a negotiation may occur using an unencrypted protocol such as, for example, the session description protocol (SDP) and/or the extensible messaging and presence protocol (XMPP). During this negotiation process, offers, that represent a set of acceptable parameters for the offer-generating entity, and answers (i.e., responses to the offers) are sent in plaintext between two entities. These are typically unencrypted metadata describing the media connection by the MoQT Relay/Consumer. Even when media content, including content items, is end-to-end encrypted, relays can access metadata related to the media content. The metadata related to the media content may comprise, for example, data relating to content characteristics such as bitrate, resolution, track and/or object. In some examples, this negotiation may occur between a viewing computing device and an intermediate node, such as a MoQT consumer/relay.

The SDP defines a number of descriptors including, for example, descriptors that describe connection information and bandwidth information.

TABLE 1

| SDP Descriptors | |
|---|---|
| Session description | |
| v= | protocol version |
| o= | originator and session identifier |
| s= | session name |
| i = * | session information |
| u = * | URI of description |
| e = * | email address |
| p = * | phone number |
| c = * | connection information |
| b = * | zero or more bandwidth information lines |
| a = * | zero or more session attribute lines |
| Time description | |
| t= | time the session is active |
| r = * | zero or more repeat times |
| z = * | optional time zone offset line |
| Media description, if preset | |
| m= | media name and transport address |
| i = * | media title |
| c = * | connection information |
| b = * | zero or more bandwidth information lines |
| a = * | zero or more media attribute lines |

With reference to FIG. 4 above, when connection parameters (including QoS parameters) are negotiated by a viewer and associated producer/relay, the QIM 414 residing in the MoQT relay or consumer at the edge of the access network (at the CMS 406) parses 420 the connection information. The QIM 414 may derive parameters such as bandwidth, latency and priority. For example, a viewing computing device may advertise a certain minimum acceptable bandwidth for high quality viewing and/or a guideline for average bandwidth based on, for example, its display resolution. A priority may also be specified in a QUIC stream. Such priority may be interpreted to mean, for example, low or ultra-low latency delivery by the QIM 414. An application-dependent latency value may also be separately specified in the connection negotiation. After parsing the connection parameters, the QIM 414 transmits 422 the negotiated communication parameters to the manager 416. In this example, the manager 416 is a PCMM application manager, and the QIM 414 makes an application programming interface (API) call to the application manager with the negotiated communication parameters. In some examples (not shown), the application manager may be co-located with the QIM 414. After receiving the request from the QIM 414, the application manager begins the process of configuring a portion of the communication resource dynamically. The request is transmitted to a policy server and validated, as described above in connection with FIG. 2. After the new service is configured, the MoQT session data traffic is transferred to the newly provisioned communication resource using the relevant Flow ID (5-tuple). In this manner, the media meant for real-time delivery is transferred to the communication resource.

In another example, the system of FIG. 4 may be configured to enable low latency treatment for MoQT data traffic. In this example, low latency treatment is provided for the MoQT traffic, rather than configuring new bandwidth. This use case may occur when, for example, the CMTS logic may determine that sufficient idle bandwidth exists on a statically configured connection between the CMTS 406 and the cable modem 402 to which the MoQT traffic is directed. This use case may also occur where, for example, there is no agreement between an ISP and OTT provider to separate MoQT traffic, such that streamed media from the OTT provider is counted against used tonnage (for example, where data caps are utilized) and is sent within the statically configured downstream channel.

In this example, the manager 416 comprises a service flow manager (classic/low latency). The QIM 414 parses 420 the negotiated media session parameters, and then the QIM 414 issues a request 422 to the service flow manager entity responsible for validating whether the MoQT data traffic is entitled to low latency treatment. In some examples, such a function may be subsumed by a policy server on the cable network. If the validation check passes, a differentiated services code point (DSCP) marking, with respect to explicit congestion notification (ECN)-capable transport (ECT), (such as ECT(1) or ECT(0)) may be applied 424, for example, to the downstream MoQT data using the flow ID and/or the 5-tuple that identifies this traffic.

Figure 5:
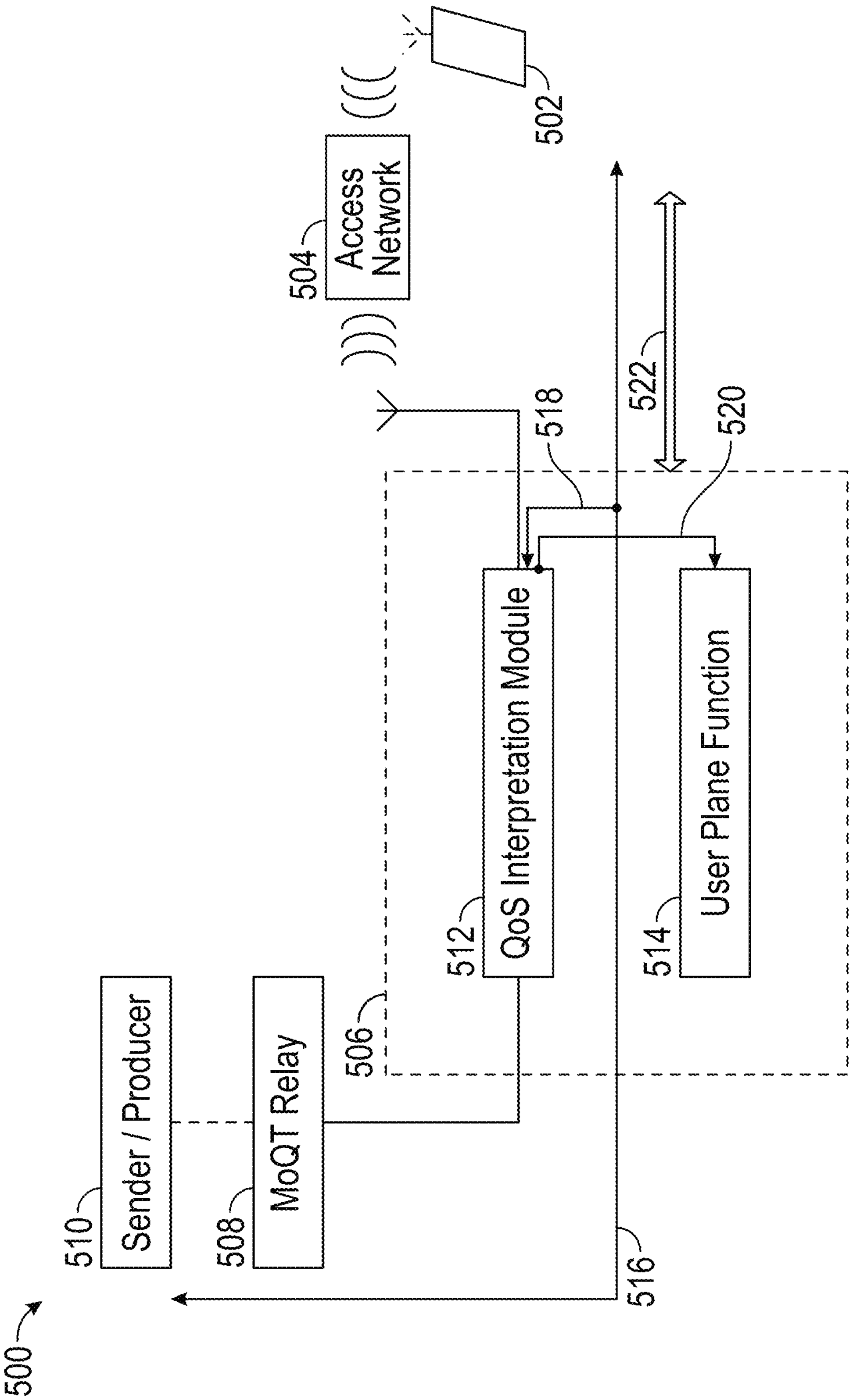
FIG. 5 shows another schematic diagram of a system for provisioning QoS for content item delivery in accordance with some embodiments of the disclosure.

FIG. 5 shows another schematic diagram of a system for provisioning QoS for content item delivery in accordance with some embodiments of the disclosure, in particular, FIG. 5 shows re-configuring QoS for a MoQT data session over a 5G network. The environment 500 comprises a user equipment device 502, such as a computing device, an access network 504, a base station 506, a MoQT relay 508 and a sender/producer 510. The base station 506 comprises a QIM 512 and a user plane function 514.

FIG. 5 depicts how QoS may be re-configured for a MoQT data session with a user equipment device 502 over a 5G network. In a 5G network, communication resource provisioning is typically dynamic, rather than the typically static configuration of communication resource over a cable network. The MoQT Relay/Consumer node may be collocated with an eNB/gNB base station 506. In a similar manner to FIG. 4, the bidirectional arrow 516 represents an end-to-end negotiation of media session parameters between a producer and consumer, or a source/sender and a viewer of, for example, a real-time content item. The QIM 512 parses 518 the negotiated session parameters for the MoQT data traffic and issues 520 these parameters using an API call for QoS reconfiguration. These may be validated by the network at a policy charging function and cascade through a session management function before the user plane function 514 receives and applies the new QoS configuration. Thereafter, packet detection rules are used by the user plane function 514 to the apply 522 the QoS to the MoQT data traffic based on a 5-tuple Flow ID of the MoQT session.

In another example, a cellular ISP may automate the QoS configuration of, for example, real-time video traffic, which is typically ultra-low latency traffic. The ISP may map the resources required to deliver the ultra-low latency traffic into specific provisioned RAN slices. The MoQ video payload metadata may be parsed by the QIM functionality and, in an example, the parsed metadata may indicate that the downstream live stream is a real-time that requires, for example, 500 ms latency, then that live stream traffic may be mapped to a QoS flow identifier (QFI) into the RAN slice. In this example, metadata may comprise data indicating a latency sensitivity due to, for example, faster-paced content and/or interactive elements. The metadata also, or alternatively, indicate a content type, such as a real-time event. In some examples, despite QIM parsed MoQ parameters for a video payload (such as codec or resolution) being identical, a first slice with a relatively low QFI value may be allocated to, for example, a live baseball stream because latency needed is not as stringent for a baseball game, as it is a relatively slow game. A second slice may be allocated to a video MoQ session (parsed by QIM) with a different QFI value. In this example, the video may be transmitted from an operator internal core network and hence be subject to relatively less packet loss (as opposed to, for example, the public Internet), despite possibly having more serious latency requirements compared to the baseball game session.

In some examples, for upstream live media traffic, an application may request the QoS it needs (based on the, for example, the nature of the application, such as cloud gaming and/or digital bidding) from a CMTS, eNB and/or gNB in the same manner. In that situation, the end point is the producer and QIM may be the relay/consumer, again parsing the MoQ media payload metadata to make the flow ID assignments, as discussed above.

In a further example, a QIM may determine that a subscribed MoQ stream has media characteristics (such as resolution, bandwidth, latency) that cannot be satisfied by current customer service resources, by parsing SDP data or MoQ metadata. This could be due to, for example, a customer being on a relatively low bandwidth service package, or too many simultaneous low latency video sessions may be active one a single connection at that time. In this example, the QIM may compute what can be satisfied in terms of media delivery with the current customer service parameters. For example, the QIM computation result may result in only a certain bandwidth being allocated for this new MoQ session, or only certain requested latency requirements may be satisfied, based on a policy. Then, at this point, the access network element such as the CMTS (physical or virtual), eNB and/or gNB may start transcoding operations. Acting as MoQ relays, they will communicate to the end client with the new MoQ metadata the parameters of the transcoded media delivery, such as adjusted resolution, changed code and/or updated latency signaling. In order for the transcoding operation to happen at the MoQ relay and commence, the relay may have to wait for the stream MoQ object to arrive to operate on its payload. In some examples, the QIM, once it determines that the subscribed MoQ session parameters cannot be satisfied with the subscriber QoS profile, may transmit a MoQ stream cancellation message to the MoQ publisher and look/query for a, for example, lower resolution (but still live) MoQ stream. In another example, the QIM may also look for previously announced live MoQ streams from the same publisher.

Figure 6:
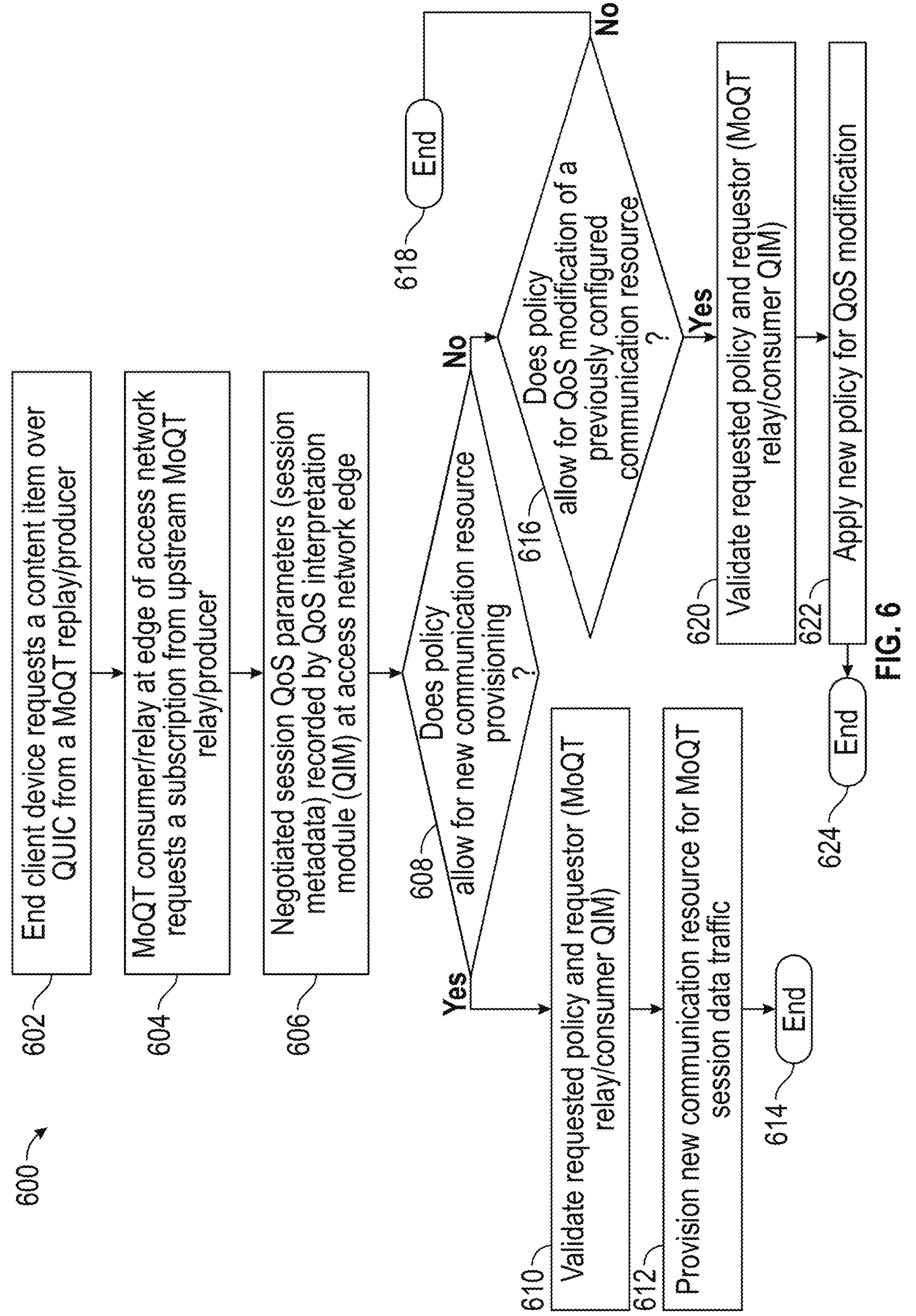
FIG. 6 shows a flow diagram of illustrative steps for enabling provisioning QoS for content item delivery in accordance with some embodiments of the disclosure.

FIG. 6 shows a flow diagram of illustrative steps for enabling provisioning QoS for content item delivery in accordance with some embodiments of the disclosure. Process 600 may be implemented, in whole or in part, on any of the computing devices mentioned herein. In addition, one or more actions of the process 600 may be incorporated into or combined with one or more actions of any other processes or embodiments described herein.

At 602, an end client computing device requests a content item, such as a livestream, over QUIC from a MoQT relay and/or producer node. At 604, the MoQT consumer and/or relay node at the edge of an access network, such as an ISP access network, requests a subscription for the media track associated with the requested content item from an upstream MoQT relay and/or producer. At 606, negotiated session QoS parameters (session metadata) is recorded by a QIM at the access network edge. At 608, it is determined whether a policy allows for new communication resource provisioning.

If, at 608, it is determined that the policy allows for new communication resource provisioning, then the process proceeds to step 610, where a requested policy and requestor (typically, a MoQT relay and/or a consumer QIM associated with a CMTS (physical and/or virtual), eNB and/or gNB are validated. A policy server, and/or policy charging function associated with the access network may be involved in the request validation. Once the request is validated, at 612, a new communication resource for MoQT session data traffic is provisioned and subsequent MoQT session data traffic is shifted to the new communication resource by reading the flow ID and/or 5-tuple associated with the data packets, and at 614 the process ends.

If, at 608, it is determined that the policy does not allow for new communication resource provisioning, then the process proceeds to step 616, where it is determined whether the policy allows for an existing communication resource to be reconfigured and/or modified for QoS provisioning. If, at step 616, it is it is determined that the policy does not allow for a QoS modification of a previously configured communication resource, then the process proceeds to step 618, where the process ends. If, at step 616, it is it is determined that the policy does allow for a QoS modification of a previously configured communication resource, then the process proceeds to step 620, where a requested policy and requestor (typically, a MoQT relay and/or a consumer QIM) are validated before, at 622, the new policy for QoS modification is applied. The new policy may relate to, for example, low latency or queue-priority treatment for MoQT session data traffic. MoQT session data traffic is provided QoS treatment, such as low latency or priority handling, and DSCP markings may be inserted at the access network edge to enable the packet treatment policy. At 624 the process ends.

Typically, the QIM is associated with the MoQT consumer/relay node at the edge of the access network, i.e., where it meets the core network. The QIM resides at the application layer, for it to read the negotiated parameters. The QIM function; however, is also logically collocated with the CMTS (virtual and/or physical), eNB and/or gNB and effects changes on downstream access network. The QIM issues an API call that may provision or modify layer 1 and/or layer 2 resources. Once the layer 1 and/or layer 2 resources are reconfigured, or new resources are provisioned, the 5-tuple is used to apply the treatment to the MoQT session data traffic.

The QUIC protocol enables the division of an HTTP session into QUIC streams. Each QUIC stream may be associated with a priority level, described by a numerical urgency value and a Boolean incremental flag. The urgency (u) parameter value is an integer, between 0 and 7 inclusive, in descending order of priority, with a default of 3. Endpoints may use this parameter to communicate the precedence of HTTP responses. The incremental (i) parameter value is Boolean. It indicates if an HTTP response can be processed incrementally, i.e., provide an indication as chunks of the response arrive. The default value of the incremental parameter is false (0).

A priority value, or a set of values that indicate priority, may be read from a session parameter negotiation (via metadata) for an entire HTTP session, or they may be read from QUIC stream metadata. Where the priority value is read from QUIC stream metadata, packet level metadata surfaced by MoQT protocol indicates the (u, i) priority. Thresholding logic on (u, i) enables the determination of whether a QUIC stream is provided priority handling by adjusting the DSCP marking (for example, low latency, low loss (L4S) enablement sets ECT(1) bit in the IP header type of service (ToS) byte that affects the DSCP marking).

Figure 7:
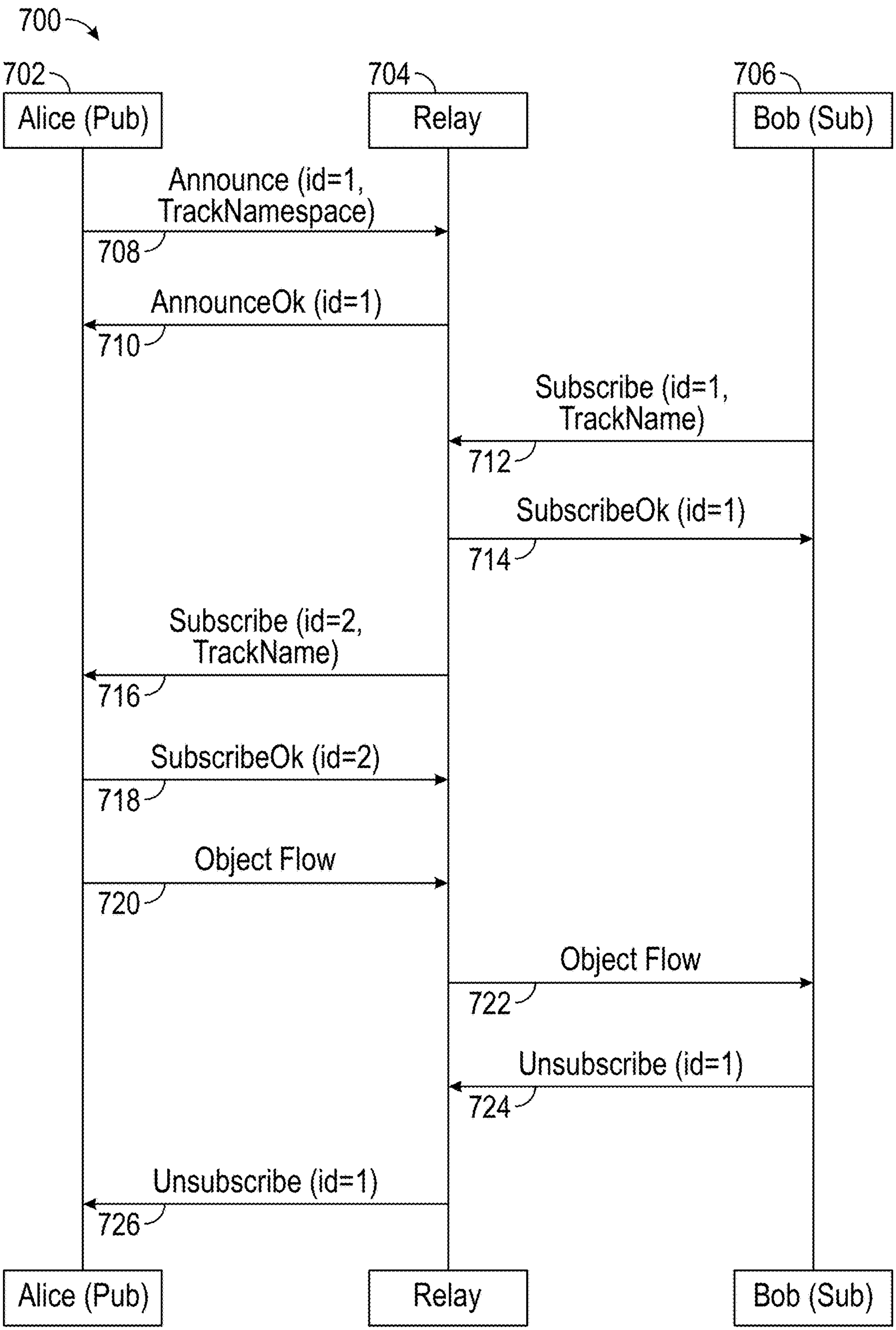
FIG. 7 shows another flow diagram of illustrative steps for enabling provisioning QoS for content item delivery in accordance with some embodiments of the disclosure.

FIG. 7 shows another flow diagram of illustrative steps for enabling provisioning QoS for content item delivery in accordance with some embodiments of the disclosure. Process 700 may be implemented, in whole or in part, on any of the computing devices mentioned herein. In addition, one or more actions of the process 700 may be incorporated into or combined with one or more actions of any other processes or embodiments described herein.

The process 700 comprises Alice (a producer computing device) 702, a relay computing device 704, and Bob (a consumer computing device) 706. Alice 702 transmits a MOQT ANNOUNCE message 708, which may comprise a namespace under which she is going to publish tracks, such as content items, to the relay computing device 704. The relay computing device 704 transmits an ANNOUNCE_OK message 710 to Alice 702, acknowledging receipt of the ANNOUNCE message 708. Bob 706 transmits a first SUBSCRIBE message 712, which comprises a request to receive a content item, to the relay computing device 704. The first SUBSCRIBE message 712 may also comprise a FullTrackName (identified by its TrackNamespace and TrackName). The relay computing device 704 transmits a first SUBSCRIBE_OK message 714 to Bob 706, acknowledging receipt of the first SUBSCRIBE message 712.

The relay computing device 704 makes a downstream subscription via a second SUBSCRIBE message 716 to Alice 702, since the track namespace in the first SUBSCRIBE message 712 matches the track namespace in the ANNOUNCE message 708 from Alice 702. Alice 702 responds by transmitting a second SUBSCRIBE_OK message 718 to the relay computing device 704, and transmits the requested object 720, such as a media content item, to the relay computing device 704. The relay computing device 704 transmits the object 722 to Bob 706. After receiving the object, Bob responds by transmitting a first UNSUBSCRIBE message 724 to the relay computing device 704, and the relay computing device 704 transmits the UNSUBSCRIBE message to Alice 702.

Figure 8:
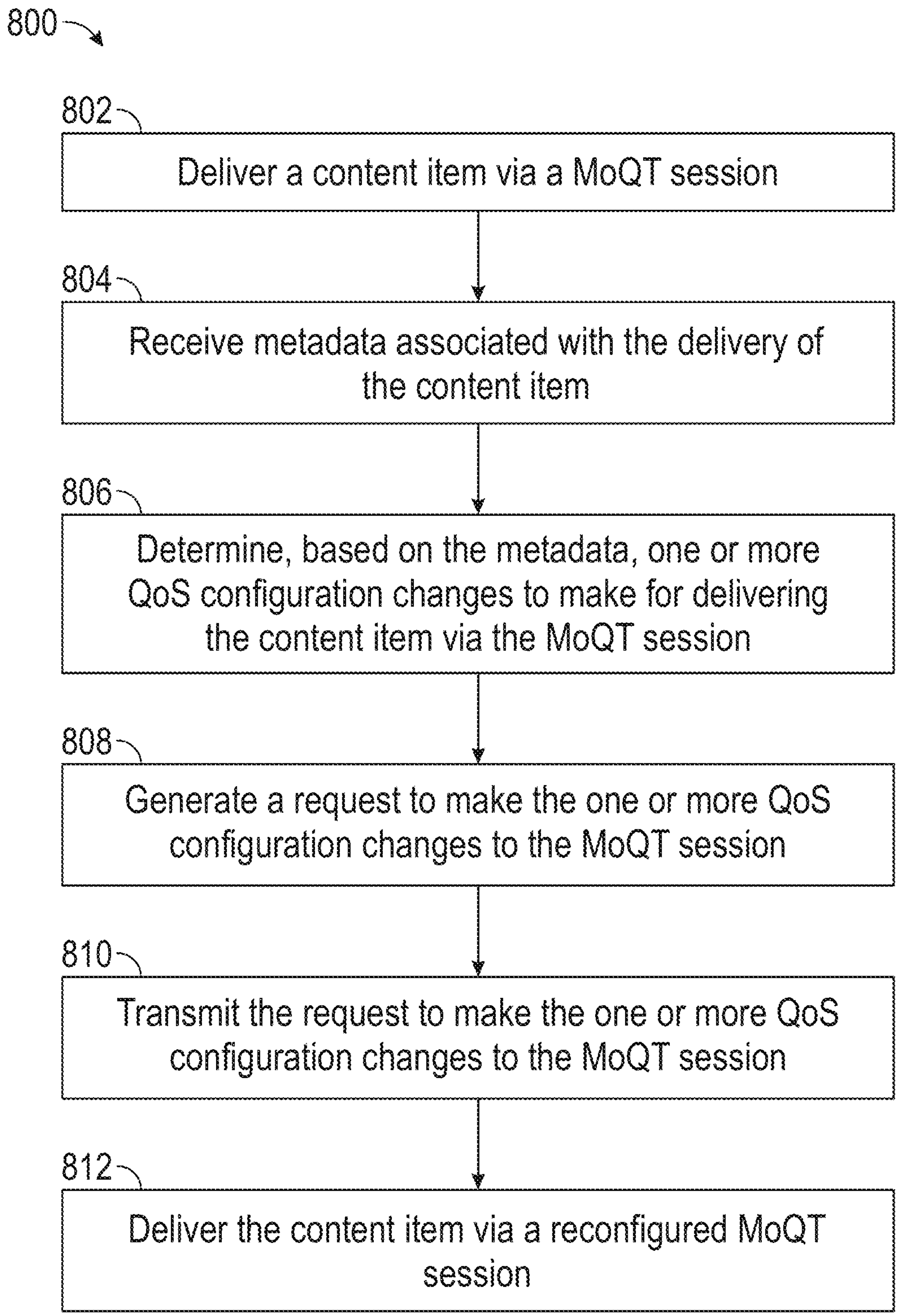
FIG. 8 shows another flow diagram of illustrative steps for enabling provisioning QoS for content item delivery in accordance with some embodiments of the disclosure.

FIG. 8 shows another flow diagram of illustrative steps for enabling provisioning QoS for content item delivery in accordance with some embodiments of the disclosure. Process 800 may be implemented, in whole or in part, on any of the computing devices mentioned herein. In addition, one or more actions of the process 800 may be incorporated into or combined with one or more actions of any other processes or embodiments described herein.

At 802, a content item is delivered via a MoQT session. The content item may be delivered by at least one MoQT relay and via an access network. At 804, metadata associated with the delivery of the content item is received. The metadata may be received at one or more MoQT relays of the at least one MoQT relay that delivers the content item. At 806, one or more QoS configuration changes to make for delivering the content item via the MoQT session are determined based on the metadata. The one or more QoS configuration changes may be determined at the MoQT relay. At 808, a request to make the one or more QoS configuration changes to the MoQT session is generated, and at 810, the request to make the one or more QoS configuration changes to the MoQT session is transmitted. At 812, the content item is delivered via a reconfigured MoQT session. The content item may be delivered via the MoQT relay.

Figure 9:
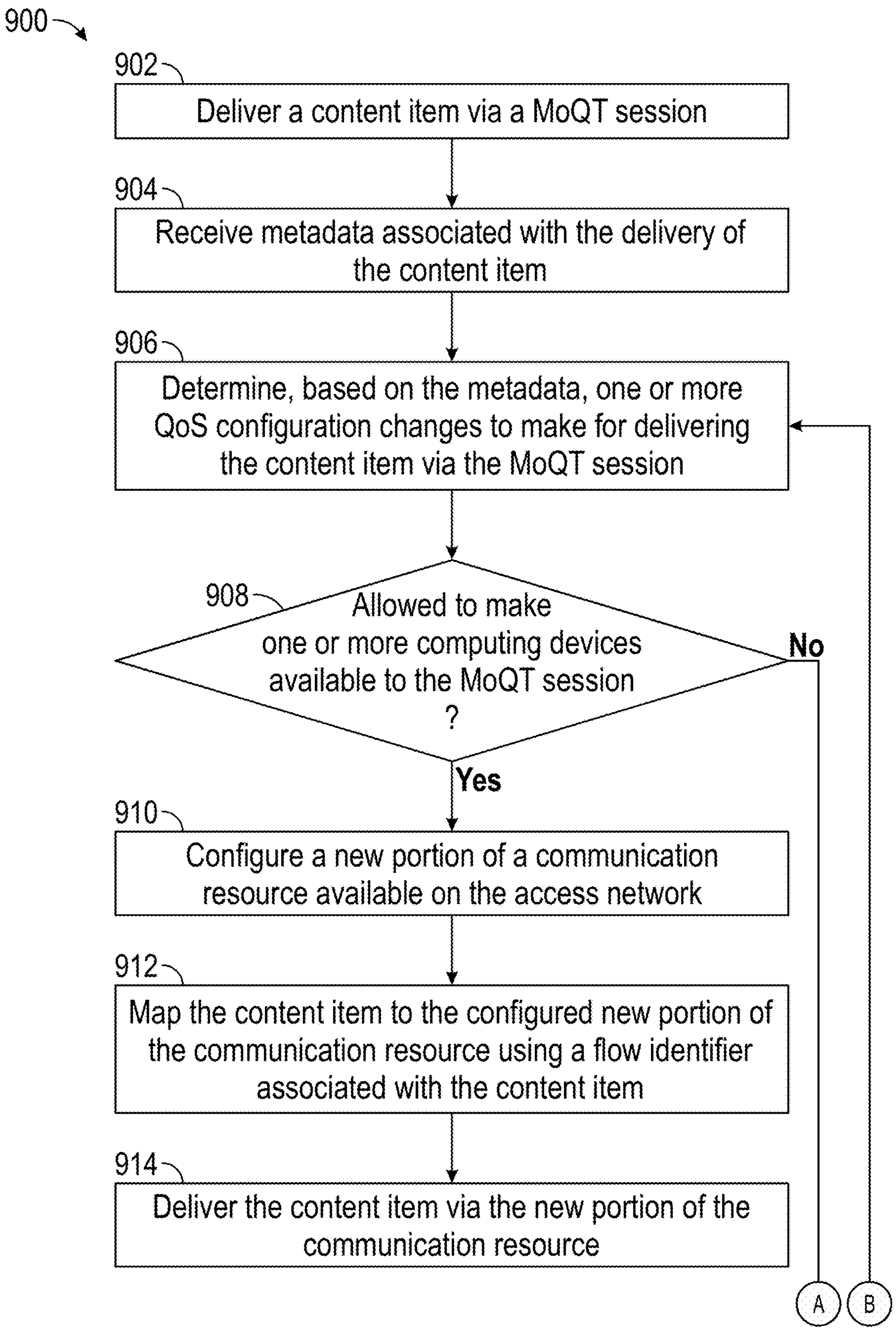
FIG. 9 shows another flow diagram of illustrative steps for enabling provisioning QoS for content item delivery in accordance with some embodiments of the disclosure.
Figure 9:
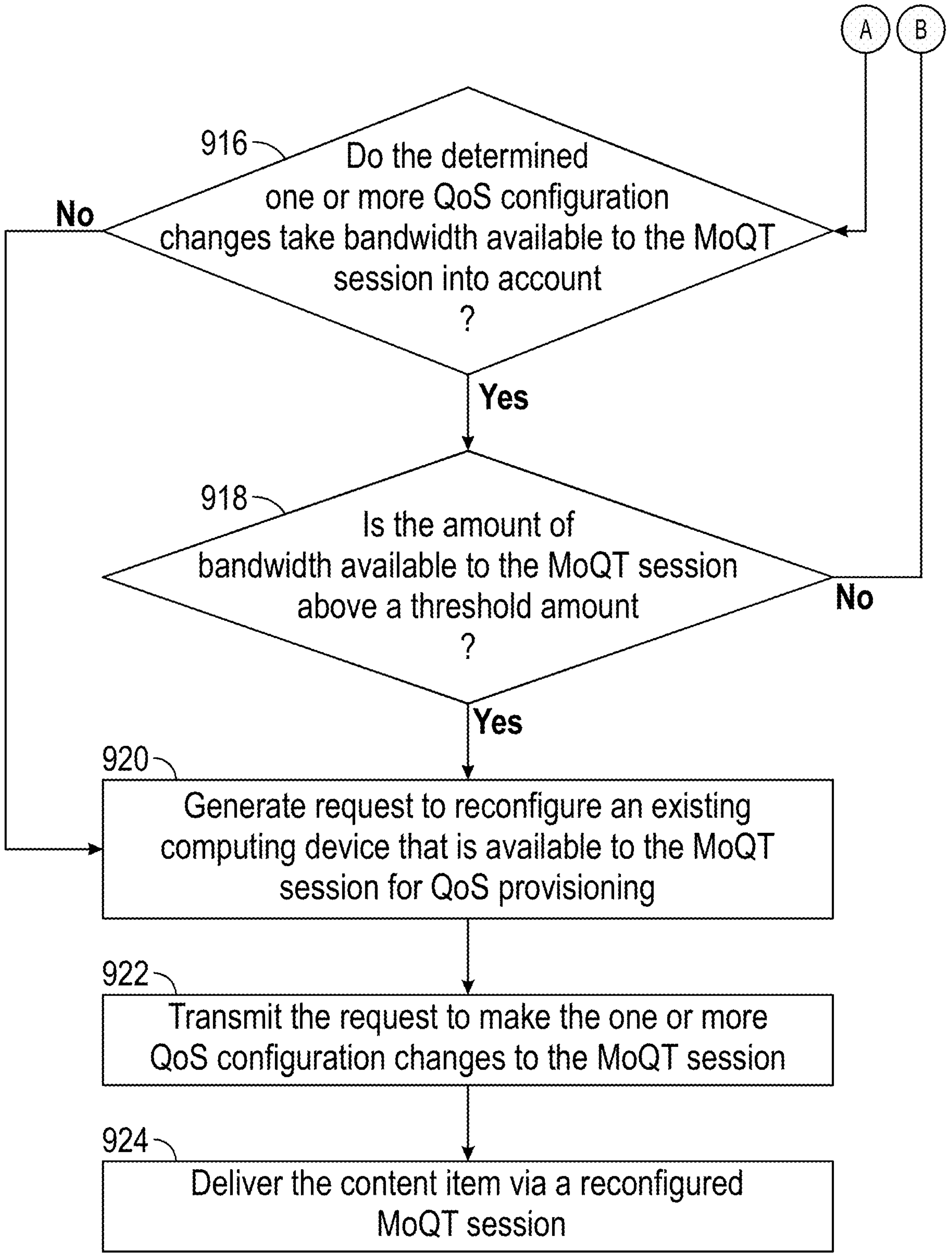

FIG. 9 shows another flow diagram of illustrative steps for enabling provisioning QoS for content item delivery in accordance with some embodiments of the disclosure. Process 900 may be implemented, in whole or in part, on any of the computing devices mentioned herein. In addition, one or more actions of the process 900 may be incorporated into or combined with one or more actions of any other processes or embodiments described herein.

At 902, a content item is delivered via a MoQT session. The content item may be delivered by at least one MoQT relay and via an access network. At 904, metadata associated with the delivery of the content item is received. The metadata may be received at one or more MoQT relays of the at least one MoQT relay that delivers the content item. At 906, one or more QoS configuration changes to make for delivering the content item via the MoQT session are determined based on the metadata. The one or more QoS configuration changes may be determined at the MoQT relay. At 908, it is determined whether one or more computing devices are allowed to be made available to the MoQT session. The one or more computing devices may comprise a computing device that is configured to provision the network or a client. This determination of whether one or more computing devices are allowed to be made available to the MoQT session may be determined, for example, via a policy that indicates whether computing devices are allowed to be made available to the MoQT session.

If, at 908, it is determined that one or more computing devices are allowed to be made available to the MoQT session, then the process proceeds to step 910, where a new portion of a communication resource available on the access network is configured. At step 912, the content item is mapped to the configured new portion of the communication resource using a flow identifier associated with the content item. At step 914, the content item is delivered via the new portion of the communication resource.

If, at 908, it is determined that one or more computing devices are allowed to be made available to the MoQT session, then the process proceeds to step 916, where it is determined whether the one or more QoS configuration changes take bandwidth available to the MoQT session into account. If, at 916, it is determined that the one or more QoS configuration changes do not take bandwidth available to the MoQT session into account then the process proceeds to step 920. If, at 916, it is determined that the one or more QoS configuration changes take bandwidth available to the MoQT session into account, then the process proceeds to step 918. At step 918, it is determined whether the amount of bandwidth available to the MoQT session above a threshold amount. If, at step 918, it is determined that the amount of bandwidth available to the MoQT session is not above a threshold amount, then the process loops back to step 906. If, at step 918, it is determined that the amount of bandwidth available to the MoQT session is above a threshold amount, then the process proceeds to step 920. At 920, a request to reconfigure an existing computing device that is available to the MoQT session for QoS provisioning is generated, and at 922, the request to make the one or more QoS configuration changes to the MoQT session is transmitted. This may be transmitted from the MoQT relay. At 924, the content item is delivered via a reconfigured MoQT session. The content item may be delivered via the MoQT relay.

Figure 10:
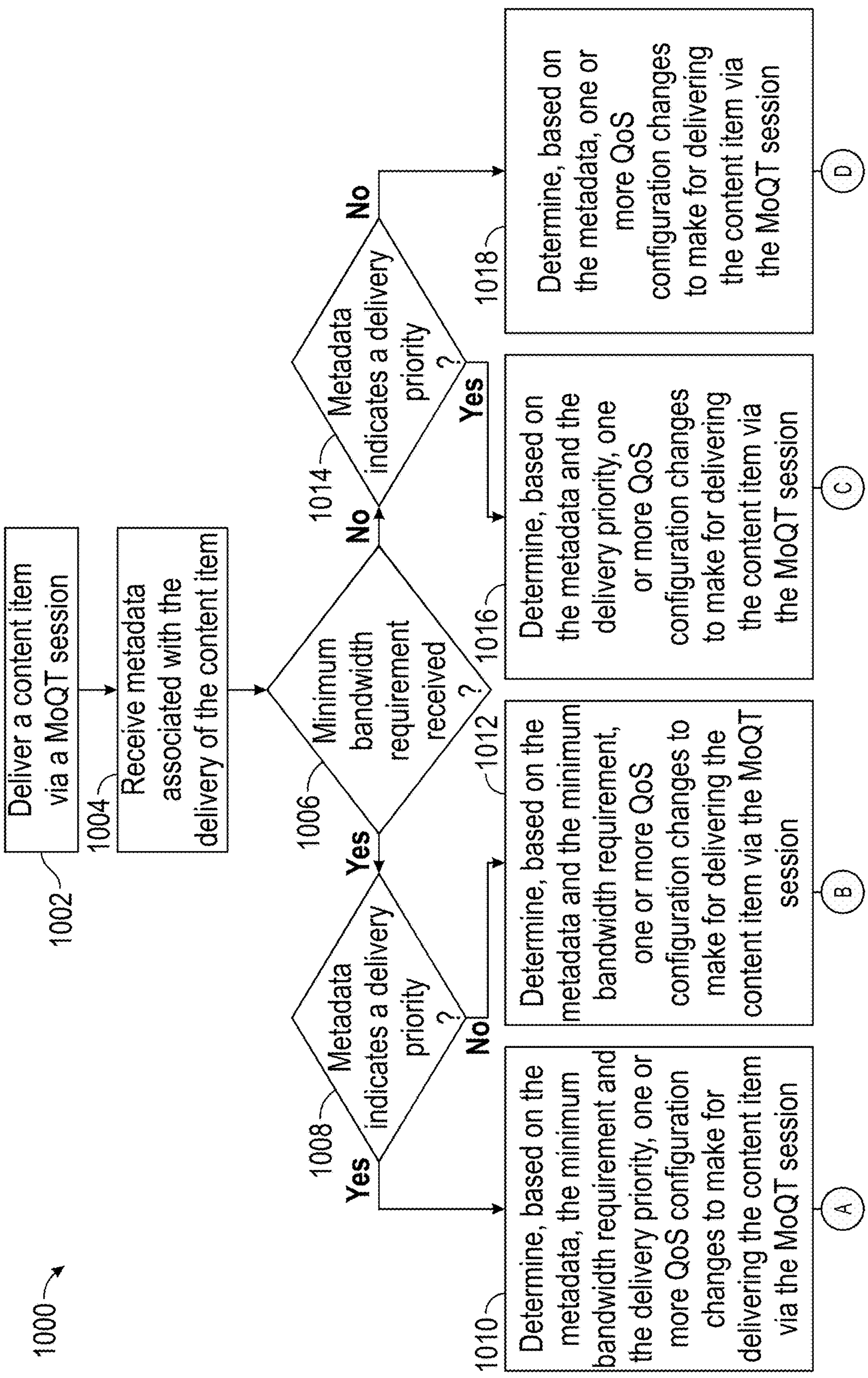
FIG. 10 shows another flow diagram of illustrative steps for enabling provisioning QoS for content item delivery in accordance with some embodiments of the disclosure.
Figure 10:
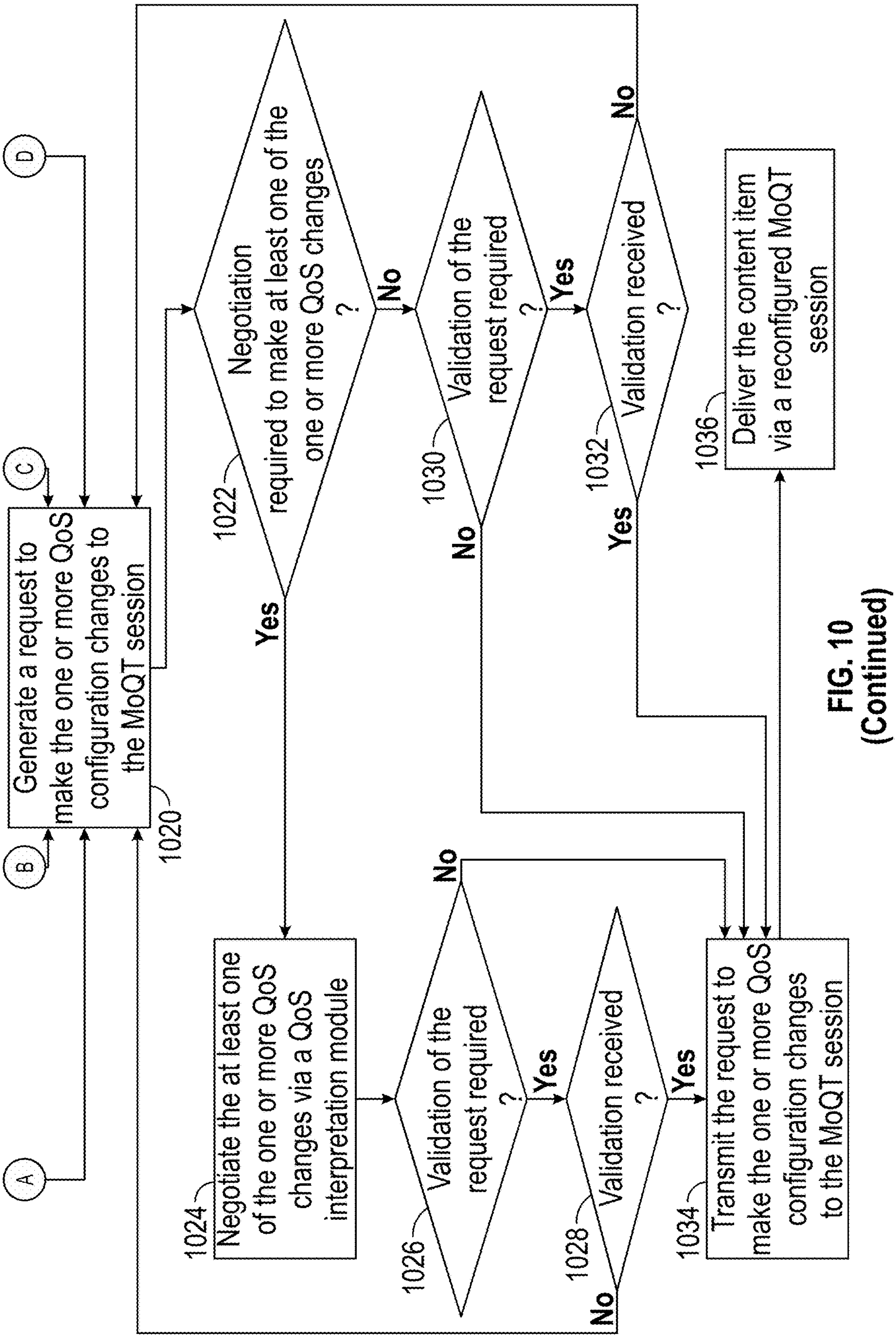

FIG. 10 shows another flow diagram of illustrative steps for enabling provisioning QoS for content item delivery in accordance with some embodiments of the disclosure. At 1002, a content item is delivered via a MoQT session. The content item may be delivered by at least one MoQT relay and via an access network. At 1004, metadata associated with the delivery of the content item is received. The metadata may be received at one or more MoQT relays of the at least one MoQT relay that delivers the content item. At 1006, it is determined whether a minimum bandwidth requirement has been received. For example, the received metadata may indicate a minimum bandwidth requirement.

If, at step 1006, it is determined that a minimum bandwidth requirement has been received, the process proceeds to step 1008. At step 1008, it is determined whether the metadata indicates a delivery priority.

If, at step 1008, the metadata indicates a delivery priority, then the process proceeds to step 1010. The delivery priority may indicate a high, medium or low delivery priority. In other examples, an integer value may be assigned for the delivery priority, for example a value of 1-5, and the delivery priority may be based on the assigned value. At step 1010, one or more QoS configuration changes to make for delivering the content item via the MoQT session is determined based on the metadata, the minimum bandwidth requirement and the delivery priority. The process then proceeds to step 1020.

If, at step 1008, the metadata does not indicate a delivery priority, then the process proceeds to step 1012. At step 1012, one or more QoS configuration changes to make for delivering the content item via the MoQT session is determined based on the metadata and the minimum bandwidth requirement. The process then proceeds to step 1020.

If, at step 1006, it is determined that a minimum bandwidth requirement has not been received, the process proceeds to step 1014. At step 1014, it is determined whether the metadata indicates a delivery priority.

If, at step 1014, the metadata indicates a delivery priority, then the process proceeds to step 1016. The delivery priority may indicate a high, medium or low delivery priority. In other examples, an integer value may be assigned for the delivery priority, for example a value of 1-5, and the delivery priority may be based on the assigned value. At step 1016, one or more QoS configuration changes to make for delivering the content item via the MoQT session is determined based on the metadata and the delivery priority. The process then proceeds to step 1020.

If, at step 1014, the metadata does not indicate a delivery priority, then the process proceeds to step 1018. At step 1018, one or more QoS configuration changes to make for delivering the content item via the MoQT session is determined based on the metadata. The process then proceeds to step 1020.

At step 1020, a request to make the one or more QoS configuration changes to the MoQT session is generated. At step 1022, it is determined whether a negotiation is required to make at least one of the one or more QoS changes.

If, at step 1022, it is determined that a negotiation is required to make at least one of the one or more QoS changes, then the process proceeds to step 1024, where the at least one of the one or more QoS changes is negotiated via a QIM. The process then proceeds to step 1026, where it is determined whether a validation of the request is required. If, at step 1026, it is determined that a validation of the request is required, then the process proceeds to step 1028, where it is determined whether the validation has been received. If the validation has not been received, the process loops back to step 1020. If the validation has been received, the process proceeds to step 1034. If, at step 1026, it is determined that a validation of the request is not required, the process proceeds to step 1034.

If, at step 1022, it is determined that a negotiation is not required to make at least one of the one or more QoS changes, then the process proceeds to step 1030, where it is determined whether a validation of the request is required. If, at step 1030, it is determined that a validation of the request is required, then the process proceeds to step 1032, where it is determined whether the validation has been received. If the validation has not been received, the process loops back to step 1020. If the validation has been received, the process proceeds to step 1034. If, at step 1030, it is determined that a validation of the request is not required, the process proceeds to step 1034.

At step 1034, the request to make the one or more QoS configuration changes to the MoQT session is transmitted. This may be transmitted from the MoQT relay. At 1036, the content item is delivered via a reconfigured MoQT session. The content item may be delivered via the MoQT relay.

Figure 11:
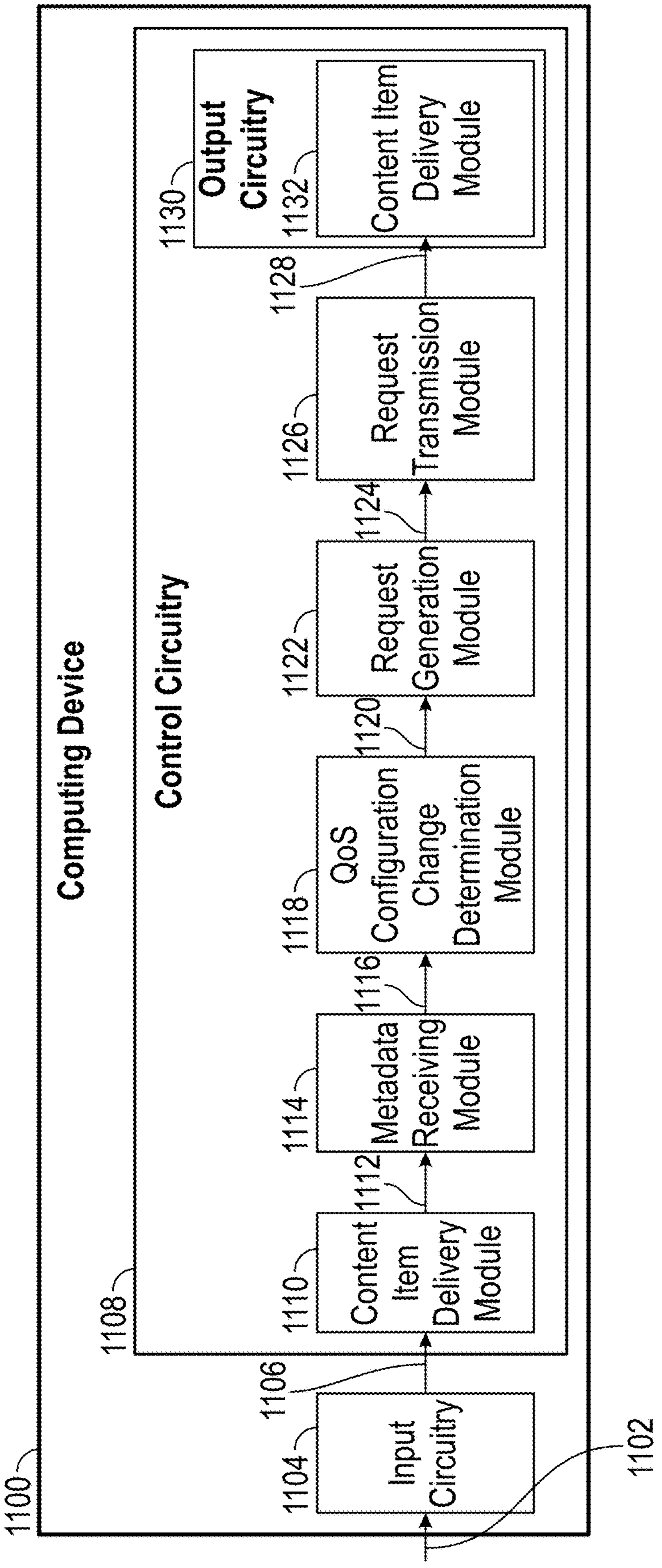
FIG. 11 shows a block diagram representing components of a computing device and dataflow therebetween for enabling provisioning QoS for content item delivery in accordance with some embodiments of the disclosure.

FIG. 11 shows a block diagram representing components of a computing device and dataflow therebetween for enabling provisioning QoS for content item delivery in accordance with some embodiments of the disclosure. Computing device 1100 comprises input circuitry 1104, control circuitry 1108 and output circuitry 1130. The computing device 1100 may be, for example, a server. Control circuitry 1108 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 8 processor). Some control circuits may be implemented in hardware, firmware, or software.

First input is received 1102 by the input circuitry 1104. The input circuitry 1104 is configured to receive inputs related to a computing device. For example, this may be via a keyboard and a mouse. In other examples, the input may be received via a touchscreen, an infrared controller, a Bluetooth and/or Wi-Fi controller of the computing device 1100, and/or a microphone. In another example, this may be via a gesture detected via an extended reality device. In a further example, the input may comprise instructions received via another computing device. The input circuitry 1104 transmits 1106 the user input to the control circuitry 1108.

The control circuitry 1108 comprises a content item delivery module 1110, a metadata receiving module 1114, a QoS configuration change determination module 1118, a request generation module 1122, a request transmission module 1126 and output circuitry 1130 comprising a content item delivery module 1132. The first input is transmitted 1106 to the content item delivery module 1110, where a content item is delivered via a MoQT session. Typically, the content item is delivered via an access network. An indication that the content item is being delivered is transmitted 1112 to the metadata receiving module 1114, where metadata associated with the delivery of the content item is received. Data, based on the received metadata is transmitted 1116 to the QoS configuration change determination module 1118, where one or more QoS configuration changes to make to the MoQT session for delivering the content item are determined. An indication of the one or more changes is transmitted 1120 to the request generation module 1122, where a request to make the one or more changes to the MoQT session is generated. The request to make the one or more changes to the MoQT session is transmitted 1124 to the request transmission module, where the request is transmitted to an appropriate computing device. An indication that the request has been transmitted, and the MoQT session has been reconfigured is transmitted 1128 to the content item delivery module 1132, where the content item is delivered via the reconfigured MoQT session.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for provisioning quality of service (QoS) for content item delivery, the method comprising:

delivering, by at least one media over QUIC transport (MoQT) relay and via an access network, the content item via a MoQT session;

receiving, at a MoQT relay of the at least one MoQT relays, metadata associated with the delivery of the content item;

determining, at the MoQT relay and based at least in part on the received metadata, one or more QoS configuration changes to make for delivering the content item via the MoQT session;

generating a request to make the one or more QoS configuration changes to the MoQT session;

transmitting, from the MoQT relay, the request to make the one or more QoS configuration changes to the MoQT session;

negotiating at least one of the one or more QoS configuration changes via a QoS interpretation module at the MoQT relay; and delivering, by the MoQT relay and via a reconfigured MoQT session, the content item.

2. The method of claim 1, wherein generating the request to make the one or more QoS configuration changes to the MoQT session comprises:

generating the request based at least in part on identifying that a new computing device cannot be made available to the MoQT session; and generating the request to reconfigure an existing computing device that is available to the MoQT session for QoS provisioning.

3. The method of claim 2, wherein:

the method further comprises identifying that a threshold amount of bandwidth is available to the MoQT session; and the generating the request to reconfigure the existing computing device is based at least in part on the threshold amount of bandwidth being available to the MoQT session.

4. The method of claim 1, wherein:

the method further comprises receiving a minimum bandwidth requirement; and the determining the one or more QoS configuration changes to make to the MoQT session for delivering the content item is further based at least in part on the minimum bandwidth requirement.

5. The method of claim 1, wherein:

the metadata indicates a priority for the delivery of the content item via the MoQT session; and determining the one or more QoS configuration changes to make to the MoQT session for delivering the content item via the MoQT session is further based at least in part on the indicated priority.

6. The method of claim 1, wherein the transmitting the request to make the one or more QoS configuration changes to the MoQT session further comprises transmitting the request based at least in part on receiving a validation of the request.

7. The method of claim 1, wherein the access network is a radio access network, a cable access network or a hybrid fiber-coax access network.

8. The method of claim 1, wherein the MoQT relay comprises a consumer node comprising a QoS interpretation module, or the MoQT relay comprises a Wi-Fi gateway.

9. A system for provisioning quality of service (QoS) for content item delivery, the system comprising:

input/output circuitry configured to:

deliver, by at least one media over QUIC transport (MoQT) relay and via an access network, the content item via a MoQT session; and receive, at a MoQT relay of the at least one MoQT relays, metadata associated with the delivery of the content item; and processing circuitry configured to:

determine, at the MoQT relay and based at least in part on the received metadata, one or more QoS configuration changes to make for delivering the content item via the MoQT session;

generate a request to make the one or more QoS configuration changes to the MoQT session;

transmit, from the MoQT relay, the request to make the one or more QoS configuration changes to the MoQT session;

negotiate at least one of the one or more QoS configuration changes via a QoS interpretation module at the MoQT relay; and deliver, by the MoQT relay and via a reconfigured MoQT session, the content item.

10. The system of claim 9, wherein:

the system further comprises processing circuitry configured to configure a new portion of a communication resource available on the access network; and the processing circuitry configured to deliver the content item is further configured to map the content item to the configured new portion of the communication resource using a flow identifier associated with the content item.

11. The system of claim 9, wherein the processing circuitry configured to generate the request to make the one or more QoS configuration changes to the MoQT session is further configured to:

generate the request based at least in part on identifying that a new computing device cannot be made available to the MoQT session; and generate the request to reconfigure an existing computing device that is available to the MoQT session for QoS provisioning.

12. The system of claim 11, wherein:

the processing circuitry is further configured to identify that a threshold amount of bandwidth is available to the MoQT session; and the processing circuitry configured to generate the request to reconfigure the existing computing device is configured to generate the request to reconfigure the existing computing device based at least in part on the threshold amount of bandwidth being available to the MoQT session.

13. The system of claim 9, wherein:

the processing circuitry is further configured to receive a minimum bandwidth requirement; and the processing circuitry configured to determine the one or more QoS configuration changes to make to the MoQT session for delivering the content item is further configured to make the determination based at least in part on the minimum bandwidth requirement.

14. The system of claim 9, wherein:

the metadata indicates a priority for the delivery of the content item via the MoQT session; and the processing circuitry configured to determine the one or more QoS configuration changes to make to the MoQT session for delivering the content item via the MoQT session is further based at least in part on the indicated priority.

15. The system of claim 9, wherein the processing circuitry configured to transmit the request to make the one or more QoS configuration changes to the MoQT session is further configured to transmit the request based at least in part on receiving a validation of the request.

16. The system of claim 9, wherein the access network is a radio access network, a cable access network or a hybrid fiber-coax access network.

17. The system of claim 9, wherein the MoQT relay comprises a consumer node comprising a QoS interpretation module, or the MoQT relay comprises a Wi-Fi gateway.

18. A method for provisioning quality of service (QoS) for content item delivery, the method comprising:

delivering, by at least one media over QUIC transport (MoQT) relay and via an access network, the content item via a MoQT session;

receiving, at a MoQT relay of the at least one MoQT relays, metadata associated with the delivery of the content item;

determining, at the MoQT relay and based at least in part on the received metadata, one or more QoS configuration changes to make for delivering the content item via the MoQT session;

generating a request to make the one or more QoS configuration changes to the MoQT session;

transmitting, from the MoQT relay, the request to make the one or more QoS configuration changes to the MoQT session;

configuring a new portion of a communication resource available on the access network;

mapping the content item to the configured new portion of the communication resource using a flow identifier associated with the content item; and delivering, by the MoQT relay and via the configured new portion of the communication resource, the content item.

* * * * *